(12) United States Patent
Nakata et al.

(10) Patent No.: US 8,593,545 B2
(45) Date of Patent: Nov. 26, 2013

(54) IMAGING APPARATUS, IMAGING METHOD, AND COMPUTER-READABLE RECORDING MEDIUM WITH SWITCHED IMAGE CAPTURING MODE

(75) Inventors: Koichi Nakata, Kokubunji (JP); Manabu Ichikawa, Hachioji (JP)

(73) Assignee: Olympus Imaging Corp. (JP)

( * ) Notice: Subject to any disclaimer, the term of this patent is extended or adjusted under 35 U.S.C. 154(b) by 288 days.

(21) Appl. No.: 13/154,663

(22) Filed: Jun. 7, 2011

(65) Prior Publication Data

US 2011/0304747 A1  Dec. 15, 2011

(30) Foreign Application Priority Data

Jun. 9, 2010  (JP) ................................. 2010-132404
Jun. 10, 2010 (JP) ................................. 2010-133005
Jun. 22, 2010 (JP) ................................. 2010-142059

(51) Int. Cl.
*H04N 5/262* (2006.01)
*H04N 5/222* (2006.01)

(52) U.S. Cl.
USPC .................................. 348/240.2; 348/333.02

(58) Field of Classification Search
None
See application file for complete search history.

(56) References Cited

U.S. PATENT DOCUMENTS

2007/0268394 A1*  11/2007  Nonaka et al. ............ 348/333.12
2010/0238344 A1*  9/2010  Tsai ............................... 348/361

FOREIGN PATENT DOCUMENTS

JP  2008-072231  3/2008
JP  2008-294705  12/2008
JP  2009-159550  7/2009

* cited by examiner

*Primary Examiner* — Albert Cutler
(74) *Attorney, Agent, or Firm* — Volpe and Koenig, P.C.

(57) ABSTRACT

An imaging apparatus includes a lens unit condensing light from a visual field region, an imaging unit including an imaging element which converts light condensed by the lens unit into an electric signal and continuously generating electronic image data based on the electric signal, a storage unit storing the image data generated by the imaging unit, a display unit displaying an image based on the image data generated by the imaging unit, an input unit receiving an input of a change instruction signal used to change a first capturing mode at a first vertical-to-horizontal ratio to a second capturing mode at a second vertical-to-horizontal ratio and an image trimming unit generating a captured image by trimming an image included in image data generated by the imaging unit at a vertical-to-horizontal ratio between the first and second vertical-to-horizontal ratios, when the change instruction signal is input during the first capturing mode.

15 Claims, 31 Drawing Sheets

FIG.23
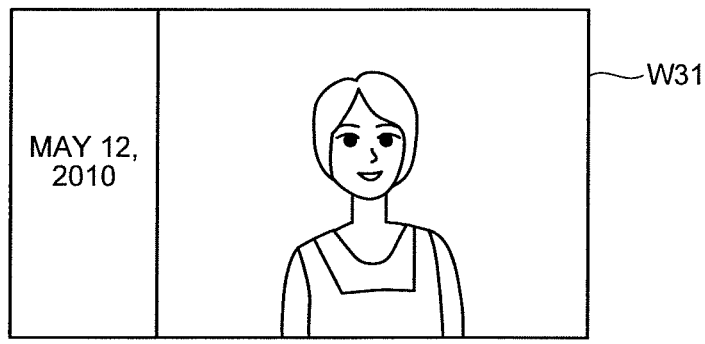
(a)
(b)
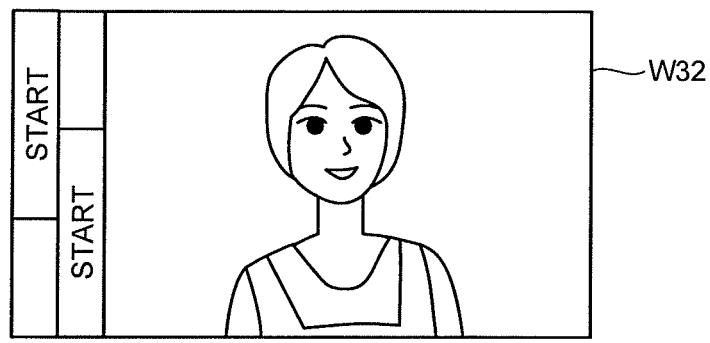
(c)
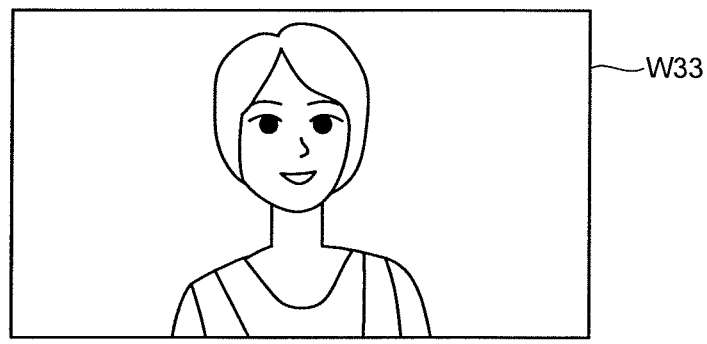

(a)　　　　　　　　　　　(b)

FIG.26
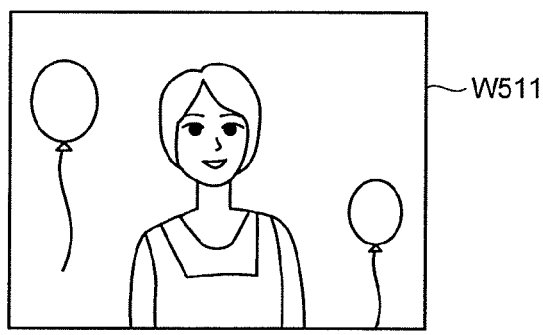
(a) W511
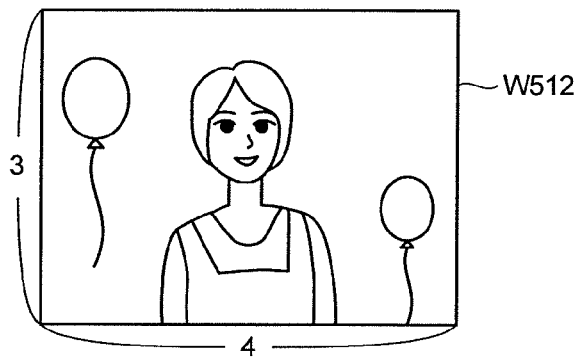
(b) W512
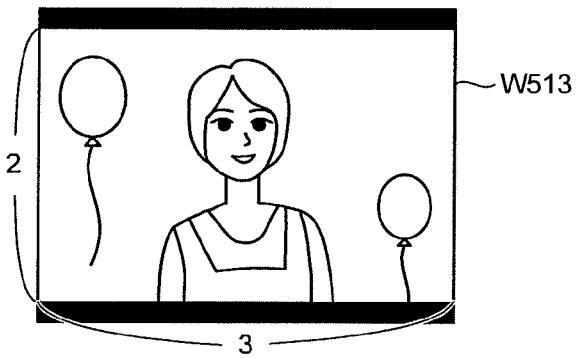
(c) W513
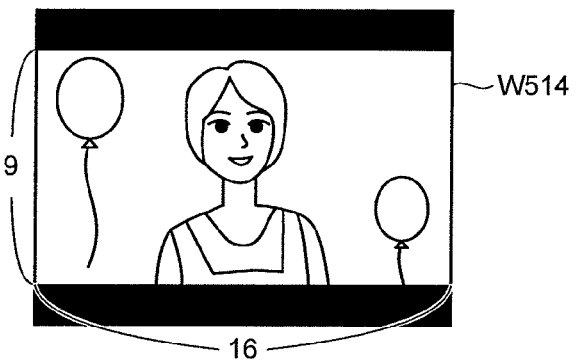
(d) W514

FIG.37

| POSITION n OF VERTICAL PIXEL LINE NOT EXTENDED | RESULT (a×n) OF EXPRESSION (1) | PITCH Pn | POSITION Kn OF VERTICAL PIXEL LINE EXTENDED |
|---|---|---|---|
| 1 | 0.009259 | 1 | 1 |
| ⋮ | ⋮ | ⋮ | ⋮ |
| 160 | 1.481481 | 1 | 160 |
| 161 | 1.490741 | 1 | 161 |
| 162 | 1.5 | 2 | 163 |
| 163 | 1.509259 | 1 | 164 |
| 164 | 1.518519 | 2 | 166 |
| ⋮ | ⋮ | ⋮ | ⋮ |
| 323 | 2.990741 | 2 | 485 |
| 324 | 3 | 3 | 488 |
| 325 | 3.009259 | 3 | 491 |
| 326 | 3.018519 | 3 | 494 |
| 327 | 3.027778 | 3 | 497 |
| ⋮ | ⋮ | ⋮ | ⋮ |
| 360 | 3.333333 | 3 | 596 |
| - | - | - | 597 |
| - | - | - | 598 |
| - | - | - | 599 |
| - | - | - | 600 |

T1

IMAGING APPARATUS, IMAGING METHOD, AND COMPUTER-READABLE RECORDING MEDIUM WITH SWITCHED IMAGE CAPTURING MODE

CROSS-REFERENCE TO RELATED APPLICATION

This application is based upon and claims the benefit of priority from Japanese Patent Application No. 2010-132404, filed on Jun. 9, 2010; Japanese Patent Application No. 2010-133005, filed on Jun. 10, 2010; and Japanese Patent Application No. 2010-142059, filed on Jun. 22, 2010, the entire contents of which are incorporated herein by reference.

BACKGROUND OF THE INVENTION

1. Field of the Invention

The present invention relates to an imaging apparatus capable of imaging a subject and generating electronic image data, an imaging method, and a computer-readable recording medium.

2. Description of the Related Art

In recent years, many imaging apparatuses such as digital cameras have not only a still image capturing function but also a moving image capturing function. Moreover, there are kinds of imaging apparatuses in which a still image capturing mode is switched to a moving image capturing mode by pressing down one button.

A vertical-to-horizontal ratio of an image recorded as a still image is generally 3/4 or 2/3 (an aspect ratio of 4:3 or 3:2). On the other hand, since a moving image has 1280×720 pixels or 1920×1080 pixels based on the standard of an HD moving image, the vertical-to-horizontal ratio is generally 9/16 (an aspect ratio of 16:9). Thus, the vertical-to-horizontal ratio of a still image is different from that of a moving image. Therefore, when the capturing mode is switched, the aspect ratio of a display area on a monitor is configured to be changed (for example, see Japanese Laid-open Patent Publication No. 2009-159550).

SUMMARY OF THE INVENTION

An imaging apparatus according to an aspect of the present invention includes a lens unit that condenses light from a visual field region; an imaging unit that includes an imaging element for converting the light condensed by the lens unit into an electric signal and continuously generates electronic image data based on the electric signal; a storage unit that stores the image data generated by the imaging unit; a display unit that displays an image based on the image data generated by the imaging unit; an input unit that receives an input of a change instruction signal used to change a first capturing mode in which capturing is performed at a first vertical-to-horizontal ratio to a second capturing mode in which the capturing is performed at a second vertical-to-horizontal ratio different from the first vertical-to-horizontal ratio; and a first image trimming unit that generates a captured image that is trimmed from an image included in image data generated by the imaging unit when the change instruction signal is input by the input unit while the imaging apparatus is in the first capturing mode, the captured image having a vertical-to-horizontal ratio between the first vertical-to-horizontal ratio and the second vertical-to-horizontal ratio.

An imaging method executed in an imaging apparatus according to another aspect of the present invention includes receiving an input of a change instruction signal for changing a first capturing mode in which capturing is performed at a first vertical-to-horizontal ratio to a second capturing mode in which the capturing is performed at a second vertical-to-horizontal ratio different from the first vertical-to-horizontal ratio; and generating a captured image trimmed from an image included in image data generated by an imaging unit of the imaging apparatus when the change instruction signal is input during the first capturing mode, the captured image having a vertical-to-horizontal ratio between the first vertical-to-horizontal ratio and the second vertical-to-horizontal ratio.

A non-transitory computer-readable recording medium according to still another aspect of the present invention has an executable program stored thereon. The program instructs a processor of an imaging apparatus to perform: receiving an input of a change instruction signal for changing a first capturing mode in which capturing is performed at a first vertical-to-horizontal ratio to a second capturing mode in which the capturing is performed at a second vertical-to-horizontal ratio different from the first vertical-to-horizontal ratio; and generating a captured image trimmed from an image included in image data generated by an imaging unit of the imaging apparatus when the change instruction signal is input during the first capturing mode, the captured image having a vertical-to-horizontal ratio between the first vertical-to-horizontal ratio and the second vertical-to-horizontal ratio.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 23 illustrates an example of an image displayed by the display unit of the imaging apparatus according to the second embodiment of the invention;

FIG. 26 illustrates a variation in the vertical-to-horizontal ratio of a captured image generated by an image trimming unit of the imaging apparatus according to the third embodiment of the invention;

FIG. 37 is a diagram illustrating the calculation result of a pitch (width) between adjacent vertical pixel lines of image data in the conversion region, in which the pitch is calculated using the calculation result of the calculation method according to the fourth embodiment of the invention.

DETAILED DESCRIPTION OF THE PREFERRED EMBODIMENTS

First Embodiment

Figure 1:
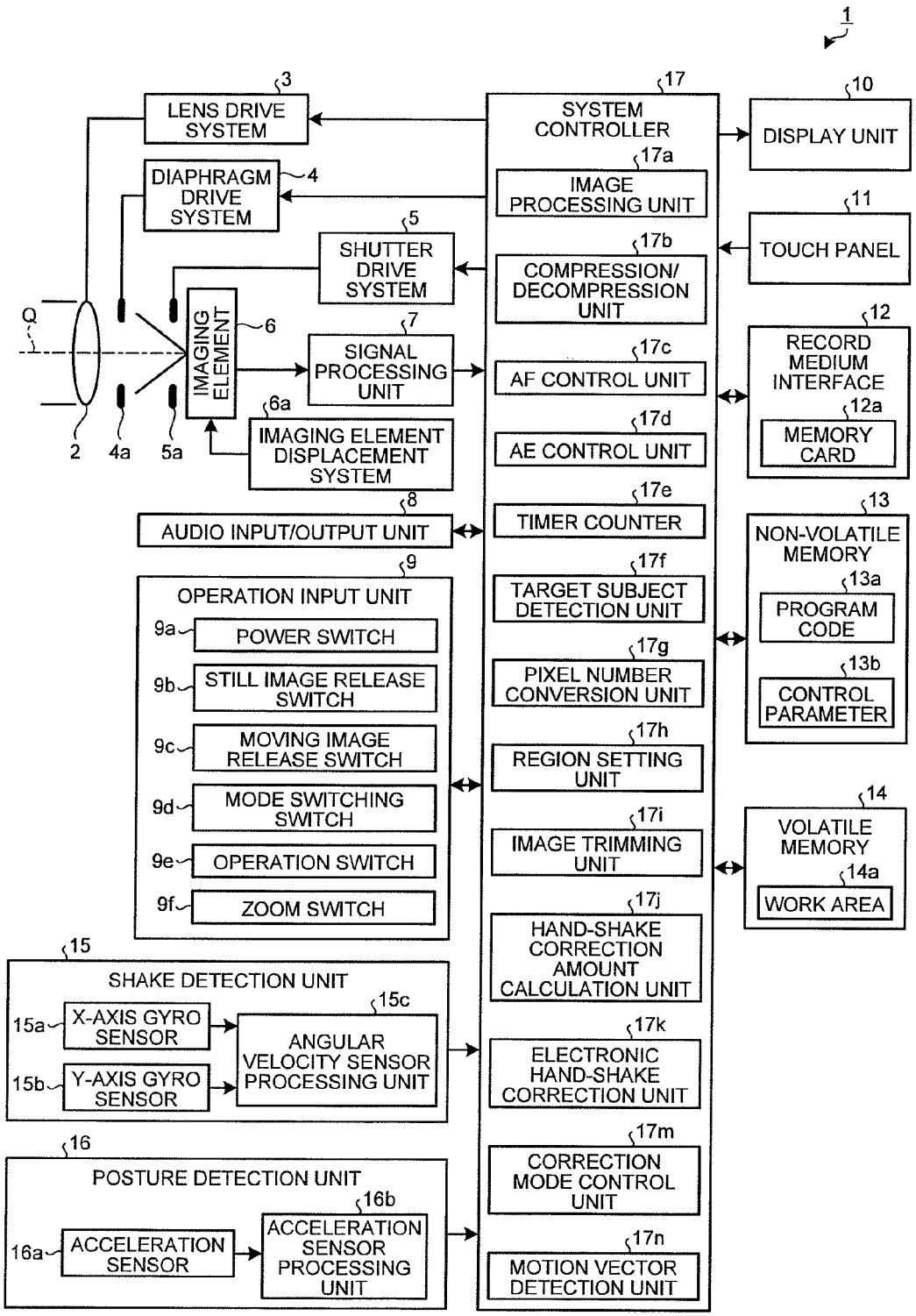
FIG. 1 is a block diagram illustrating the configuration of an imaging apparatus according to a first embodiment of the invention.
Figure 2:
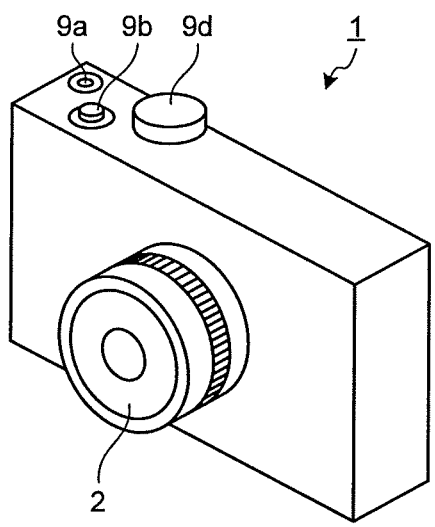
FIG. 2 is a perspective view illustrating the outward appearance of the imaging apparatus shown in FIG. 1 when viewed from the front side.
Figure 3:
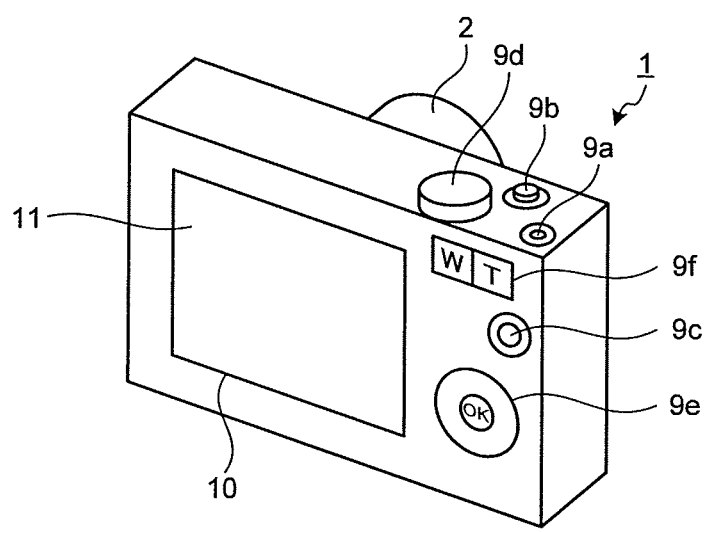
FIG. 3 is a perspective view illustrating the outward appearance of the imaging apparatus shown in FIG. 1 when viewed from the rear side.

FIG. 1 is a block diagram illustrating the configuration of an imaging apparatus according to a first embodiment of the invention. FIG. 2 is a perspective view illustrating the outward appearance of the imaging apparatus 1 shown in FIG. 1 when viewed from the side (front side) facing a subject. FIG. 3 is a perspective view illustrating the outward appearance of the imaging apparatus 1 when viewed from the side (rear side) facing a photographer.

As shown in FIGS. 1 to 3, the imaging apparatus 1 includes a lens unit 2, a lens drive system 3, a diaphragm drive system 4, a shutter drive system 5, an imaging element 6, an imaging element displacing system 6a, a signal processing unit 7, an audio input/output unit 8, an operation input unit 9, a display unit 10, a touch panel 11, a record medium interface 12, a non-volatile memory 13, a volatile memory 14, a shake detection unit 15, a posture detection unit 16, and a system controller 17.

The lens unit 2 includes a focus lens and a zoom lens. The lens unit 2 condenses light in a predetermined visual field region. The lens unit 2 has an optical zoom function of varying a field angle by moving the zoom lens along an optical axis Q.

The lens drive system 3 includes a DC motor. The lens drive system 3 adjusts a focal position or a focal distance of the lens unit 2 by moving the focus lens or the zoom lens of the lens unit 2 along the optical axis Q.

The diaphragm drive system 4 includes a diaphragm 4a and a stepping motor. The diaphragm drive system 4 adjusts an incident amount of the light condensed by the lens unit 2 by driving the diaphragm 4a.

The shutter drive system 5 includes a shutter 5a and a stepping motor. The shutter drive system 5 switches the state of the imaging element 6 between an exposure state and a light-blocking state by driving the shutter 5a.

The imaging element 6 is configured by a charge coupled device (CCD) or a complementary metal oxide semiconductor (COMS) that receives the light condensed by the lens unit 2 and converts the light into electric signals (analog signals). The imaging element 6 outputs the converted electric signal to the signal processing unit 7.

The imaging element displacing system 6a moves the imaging element 6 based on a displacement amount calculated by a hand-shake correction amount calculation unit 17j described below to prevent an image from deteriorating due to shaking during capturing a still image.

The signal processing unit 7 performs imaging processing such as amplification on the electric signal output from the imaging element 6, performs A/D conversion to convert the electric signal into digital image data, and outputs the digital image data to the volatile memory 14 via the system controller 17. An imaging unit that continuously generates electronic image data based on the light condensed by the lens unit 2 is realized by the imaging element 6 and the signal processing unit 7.

The audio input/output unit 8 includes a microphone or a speaker. For example, the audio input/output unit 8 acquires or outputs audio information.

As shown in FIGS. 2 and 3, the operation input unit 9 includes: a power switch 9a that switches the power state of the imaging apparatus 1 between an ON state and an OFF state; a still image release switch 9b that is used to input a release signal used to give an instruction to capture a still image at a first ratio, which is a vertical-to-horizontal image ratio for capturing a still image in response to a pressing force applied from the outside; a moving image release switch 9c that is capable of performing a full-pressing operation and a halfway-pressing operation in response to the pressing force applied from the outside and that receives a capturing instruction signal used to capture a moving image through the full-pressing operation and receives a change instruction signal used to change the vertical-to-horizontal ratio of an image to be captured through the halfway-pressing operation; a mode switching switch 9d that changes over various kinds of capturing modes of the imaging apparatus 1; an operation switch 9e that performs various kinds of settings of the imaging apparatus 1; and a zoom switch 9f that performs the zoom operation of the lens unit 2. In this embodiment, the moving image release switch 9c functions as an input unit.

The display unit 10 is configured by a display panel such as a liquid crystal display panel, an organic electro-luminescence (EL) display panel, or the like. The display unit 10 displays an image corresponding to the image data generated by the imaging element 6. The display unit 10 appropriately displays operation information and image-capturing information of the imaging apparatus 1. In the display unit 10, as shown in FIG. 3, a ratio of a vertical length (a length in a direction parallel to a vertical pixel line) to a horizontal length (a length in a direction parallel to a horizontal pixel line) of a display screen is 3:4. However, a ratio of the vertical length to the horizontal length of the display screen may be 9:16.

The touch panel 11 overlaps the display screen of the display unit 10 (see FIG. 3). The touch panel 11 detects a position touched by the photographer based on information displayed on the display unit 10 and receives an input of an operation signal in accordance with the touched position. In general, as a touch panel, there are a resistive touch panel, a capacitive touch panel, and an optical touch panel. In this embodiment, any touch panel may be used.

The record medium interface 12 stores information such as image data in a memory card 12a of the record medium mounted from the outside of the imaging apparatus 1 and reads the information stored in the memory card 12a.

The non-volatile memory 13 is realized by a flash memory or the like. The non-volatile memory 13 includes a program code 13a that stores various kinds of programs used to operate the imaging apparatus 1 or an image conversion program according to this embodiment and a control parameter 13b that stores various kinds of data used during execution of the programs.

The volatile memory 14 is configured by a synchronous dynamic random access memory (SDRAM). The volatile memory 14 includes a work area 14a temporarily storing the image data output from the signal processing unit 7 or information being processed by the system controller 17. Specifically, the volatile memory 14 temporarily stores an image (live-view image) corresponding to the image data output frame by frame (for example, 1/30 second) by the imaging element 6 or an image corresponding to the image data output by the imaging element 6 when the photographer operates the still image release switch 9b.

The shake detection unit 15 includes an X-axis gyro sensor 15a, a Y-axis gyro sensor 15b, and an angular velocity sensor processing unit 15c. The angular velocity sensor processing unit 15c performs A/D conversion on signals output from the X-axis gyro sensor 15a and the Y-axis gyro sensor 15b and performs predetermined signal processing. The signals are treated as angular velocity data in the system controller 17 described below.

The posture detection unit 16 includes an acceleration sensor 16a and an acceleration sensor processing unit 16b. The acceleration sensor 16a detects the direction of the gravity and an impulse applied to the camera. The acceleration sensor processing unit 16b performs A/D conversion on the signal output from the acceleration sensor 16a and performs predetermined signal processing. The signal is treated as acceleration data in the system controller 17 described below.

The system controller 17 is configured by a central processing unit (CPU) or the like. The system controller 17 reads the program from the program code 13a of the non-volatile memory 13 in response to an operation signal from the operation input unit 9 to execute the program, and gives an instruction to each of the units of the imaging apparatus 1 or transmits data to control the operation of the imaging apparatus 1 as a whole. The system controller 17 includes an image processing unit 17a, a compression/decompression unit 17b, an automatic focus (AF) control unit 17c, an automatic exposure (AE) control unit 17d, a timer counter 17e, a target subject detection unit 17f, a pixel number conversion unit 17g, a region setting unit 17h, an image trimming unit 17i, a hand-shake correction amount calculation unit 17j, an electronic hand-shake correction unit 17k, a correction mode control unit 17m, and a motion vector detection unit 17n.

The image processing unit 17a performs various kinds of image processing on the image data output from the signal processing unit 7 and outputs the processed image data to the volatile memory 14. Specifically, the image processing unit 17a performs processing such as edge enhancement, color correction, or γ correction on the image data output from the signal processing unit 7.

The compression/decompression unit 17b compresses or decompresses the image data in accordance with a JPEG compression method or the like, when the image data stored in the work area 14a of the volatile memory 14 is stored in the memory card 12a or the image data stored in the memory card 12a is displayed on the display unit 10.

The AF control unit 17c performs automatic focus adjustment based on the image data output from the signal processing unit 7. For example, the AF control unit 17c drives the lens drive system 3 based on the contrast of the image data and moves the lens unit 2 along the optical axis Q so that the sharpness of a subject image captured can become the maximum.

The AE control unit 17d performs automatic exposure by determining conditions such as a set value of the diaphragm and a shutter speed based on the image data output from the signal processing unit 7 during capturing a still image.

The timer counter 17e generates a time signal serving as a reference of the operation of the imaging apparatus 1. Based on the time signal, the system controller 17 sets an acquisition interval of the image data, an exposure time of the imaging element 6, and the like.

The target subject detection unit 17f detects the target subject included in the image corresponding to the image data output from the signal processing unit 7 by pattern matching or the like. In this embodiment, the face of a person is set as the target subject.

The pixel number conversion unit 17g converts the image data output from the signal processing unit 7 into data with the number of pixels in accordance with various kinds of capturing modes of the imaging apparatus 1. Specifically, the pixel number conversion unit 17g converts the image data into data with the number of pixels in accordance with a still image capturing mode or a moving image capturing mode.

Based on a predetermined condition, the region setting unit 17h sets the central position and the vertical-to-horizontal ratio of a region (hereinafter, referred to as a record region) trimmed to be displayed and recorded from the image corresponding to the image data output from the signal processing unit 7. Specifically, the region setting unit 17h sets the record region to have with the vertical-to-horizontal ratio 3/4 (corresponding to an aspect ratio of 4:3) during capturing the still and sets the record area to have the vertical-to-horizontal ratio 9/16 (corresponding to an aspect ratio of 16:9) during capturing the moving image. In principle, the region setting unit 17h sets the position of the record region so that the center of the record region may correspond to the center of a light-receiving region of the imaging element 6. However, the region setting unit 17h sets the position of the record region based on the detection result of the target subject detection unit 17f when the capturing mode is switched from the still image capturing mode to the moving image capturing mode.

The image trimming unit 17i generates an image to be displayed and recorded by trimming a region, which is based on the record region set by the region setting unit 17h, from the image corresponding to the image data output from the signal processing unit 7.

The hand-shake correction amount calculation unit 17j calculates a displacement amount of the imaging element 6 necessary for offsetting the displacement of a subject image occurring due to the shake of the imaging apparatus by integrating the angular velocity data input from the shake detection unit 15 during capturing the still image.

The electronic hand-shake correction unit 17k prevents the deterioration in the image caused due to the shaking by displacing the record region based on a shake amount of the image calculated by providing the record region trimmed by the image trimming unit 17i a predetermined range of a margin (shake correction region) around it and sequentially comparing the images recorded in the shake correction region during capturing the moving image.

The correction mode control unit 17m controls the operation of the electronic hand-shake correction unit 17k in accordance with the input signal from the operation input unit 9 and a predetermined condition. Here, a correction mode of the electronic hand-shake correction unit 17k is classified into an omnidirectional hand-shake correction mode for correction in both horizontal direction and vertical directions, and a unidirectional correction mode in which correction is performed for one direction but not for the other direction. The latter correction mode is a correction mode used when an image is captured during movement of the camera. For example, the latter correction mode includes a "vertical panning mode" in which the hand-shake correction is performed only for the horizontal direction but not for the vertical direction, and a "horizontal panning mode" in which the hand-shake correction is performed only for the vertical direction but not for the horizontal direction.

The motion vector detection unit 17n detects a motion amount of the entire image or a movement amount of a specific subject based on the motion vector between items of the image data chronologically input from the signal processing unit 7.

Next, the operation of the imaging apparatus 1 will be described in detail with reference to FIGS. 3 to 14. In the following description, the horizontal direction (lateral direction) is referred to as an X-axis direction and the vertical direction (longitudinal direction) is referred to as a Y-axis direction.

When the power switch 9a of the imaging apparatus 1 shown in FIG. 3 is turned on, the display unit 10 displays a live-view image corresponding to the image data that is acquired by the imaging element 6 and has passed through the signal processing by the signal processing unit 7.

Figure 4:
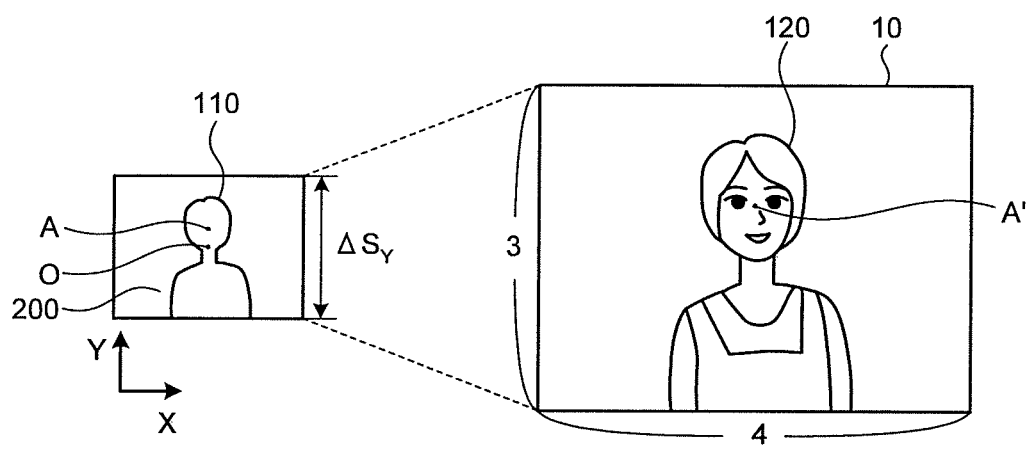
FIG. 4 is a diagram schematically illustrating a relationship between an imaging-region image and an image displayed on a display unit in a still image capturing mode.

An imaging-region image 200 shown in FIG. 4 refers to a conceptual image corresponding to one-frame image data output from the signal processing unit 7. That is, the imaging-region image 200 corresponds to the entire imageable range (for example, the entire light-receiving region) of the imaging element 6. During capturing the still image, for example, an image corresponding to the entire area of the imaging-region image 200 is displayed on the display unit 10. Therefore, when a subject image 110 is included in the imaging-region image 200, a subject image 120 corresponding to the entirety of the subject image 110 is displayed on the display unit 10. Hereinafter, on the assumption that the center (imaging region center) O of the imaging-region image 200 is the origin of the coordinates, the size of the imaging-region image 200 is represented $\Delta S_Y$ in a vertical direction.

Figure 5:
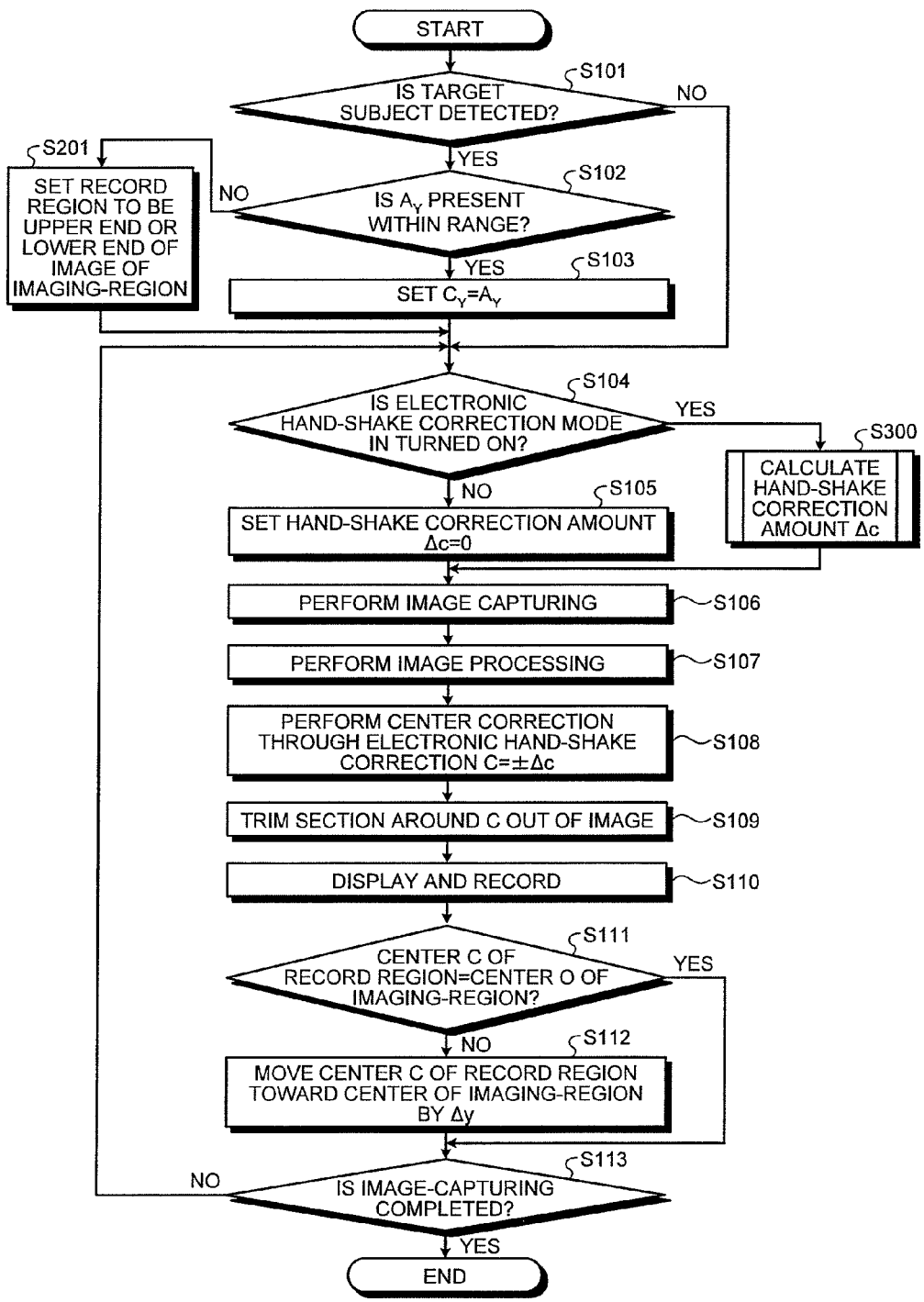
FIG. 5 is a flowchart illustrating a moving image capturing operation of the imaging apparatus shown in FIG. 1.

FIG. 5 is a flowchart illustrating a moving image capturing operation of the imaging apparatus 1.

The imaging apparatus 1 starts capturing a moving image when a release signal of giving an instruction to capture a moving image is input through the moving image release switch 9c. When the imaging apparatus 1 starts capturing the moving image, the target subject detection unit 17f of the system controller 17 detects an image (hereinafter, referred to as a "subject image") 110 of a target subject from the imaging-region image 200 and calculates a central position (subject center) A of the subject image 110 (Step S101 in FIG. 4). The subject center A may be the center of a targeted region of the subject image 110 and may not necessarily be the physical center of the subject image 110. The subject center A may be calculated by various methods depending on the kinds of subject. For example, when the target subject is the face of a person, the subject center A may be the central position between the two eyes detected by the target subject detection unit 17f.

Figure 6:
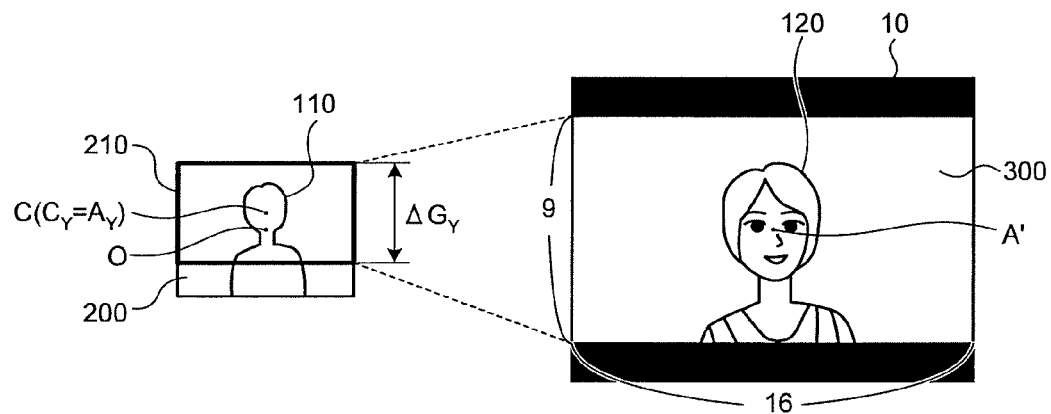
FIG. 6 is a diagram schematically illustrating a relationship between the imaging-region image and the image displayed on the display unit when a moving image starts to be captured.

When the subject image 110 is detected (Yes in Step S101), as shown in FIG. 6, the region setting unit 17h determines whether coordinates $A_Y$ of the subject center A in the vertical direction are present within the range indicated by Inequality (1) below (Step S102). In Inequality (1), $\Delta G_Y$ is the size of the record region 210 corresponding to a display region (vertical-to-horizontal ratio 9/16) 300 in the vertical direction during capturing the moving image.

$$|A_Y| \leq (\Delta S_Y - \Delta G_Y)/2 \qquad (1)$$

When the coordinate $A_Y$ is included in the above range (Yes in Step S102), the region setting unit 17h sets the value of the Y coordinate $A_Y$ of the subject center A as the Y coordinate $C_Y$ of the center (record region center) C of the record region 210 in Step S103.

On the other hand, when the coordinate $A_Y$ is not included in the above range shown in Inequality (1) (No in Step S102), the region setting unit 17h locates the record region 210 at the upper end position or the lower end potion of the imaging-region image 200 in Step S201. That is, the Y coordinate $C_Y$ of the record region center C is set as follows.

$$C_Y = (\Delta S_Y - \Delta G_Y)/2 \text{ if } A_Y > (\Delta S_Y - \Delta G_Y)/2$$

$$C_Y = -(\Delta S_Y - \Delta G_Y)/2 \text{ if } A_Y < -(\Delta S_Y - \Delta G_Y)/2$$

In this step, when the electronic hand-shake correction mode is in OFF (No in Step S104), $(\Delta c_X, \Delta c_Y) = (0, 0)$ is set as a correction amount $\Delta c$ calculated through the electronic hand-shake correction in Step S105. On the other hand, when the electronic hand-shake correction mode is in ON (Yes in Step S104), the correction amount $\Delta c(\Delta c_X, \Delta c_Y)$ is calculated in Step S300.

In Step S106, the image data imaged by the imaging element 6 and subjected to the signal processing by the signal processing unit 7 are sequentially input to the system controller 17. In Step S107, the image processing unit 17a performs the above-described image processing on the image data. In Step S108, the electronic hand-shake correction unit 17k corrects the record region center C based on the correction amount $\Delta c$ using Equation (2) below. When the electronic hand-shake correction mode is in OFF, no correction is substantially performed ($\Delta c = 0$).

$$C(C_X, C_Y) = C(C_X, C_Y) \pm \Delta c(\Delta c_X, \Delta c_Y) \qquad (2)$$

In Step S109, the image trimming unit 17i trims an image corresponding to the record region 210 set in Step S102 from the imaging-region image 200. In Step S110, the trimmed image is displayed in the display region 300 on the display unit 10 and the image data corresponding to the trimmed range is stored in the volatile memory 14.

A predetermined region on the display unit 10 is set as the display region 300 shown in FIG. 6 during capturing the moving image. In FIG. 6, the display region 300 is located at the center in the Y-axis direction of the display unit 10, but may be localized, for example, on either the upper side or the lower side.

In this Step, for example, a subject image 120 is displayed in the display region 300 in such a manner that the center A' of the subject image 120 which corresponds to the subject center A is located at the center in the Y-axis direction.

In Step S111, the region setting unit 17h determines whether the record region center C accords with the imaging-region center O. When the two centers do not accord with each other (No in Step S111), as shown in FIG. 6, the region setting unit 17h moves the record region center C by a predetermined amount $\Delta y$ in the direction toward the imaging-region center O in Step S112. For example, in FIG. 6, the record region center C is moved in the Y-axis direction (downward direction in FIG. 6).

Figure 7:
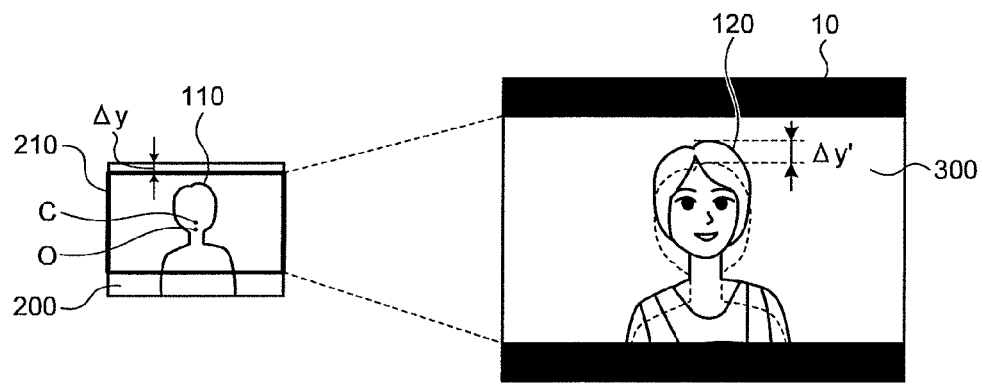
FIG. 7 is a diagram schematically illustrating a relationship between the imaging-region image and the image displayed on the display unit after the moving image is captured.

When the capturing of the moving image continues (No in Step S113) and the processes from Step S104 to Step S108 are repeated, as shown in FIG. 7, the image corresponding to the record region 210 moved downward by $\Delta y$ is trimmed from the imaging-region image 200 in Step S109. In consequence, the subject image 120 relatively moves upward by $\Delta y'$ within the display region 300 in Step S110. A dashed line shown in FIG. 7 indicates the position of the subject image 120, which is not yet changed and thus is the same as in FIG. 6.

Figure 8:
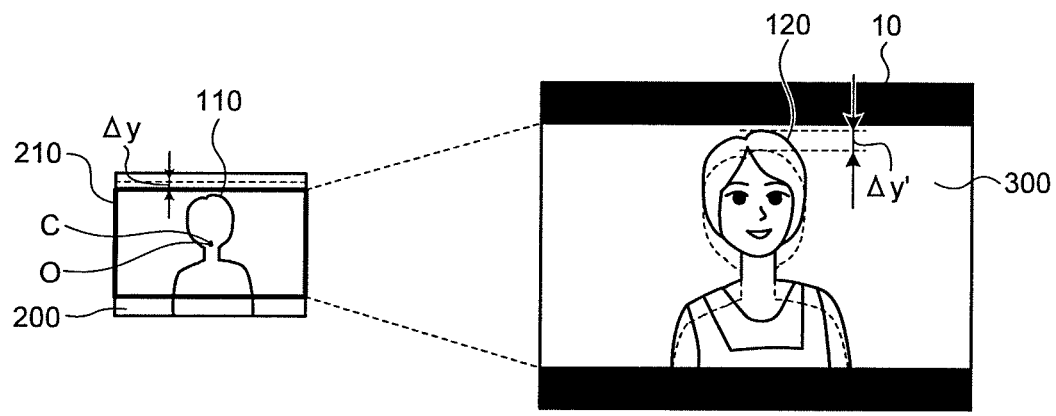
FIG. 8 is a diagram schematically illustrating a relationship between the imaging-region image and the image displayed on the display unit after the moving image is captured.

When the capturing of the moving image continues (No in Step S111, Step S112, No in Step S113, and Step S104 to S108), as shown in FIG. 8, the record region 210 is further moved downward by $\Delta y$. The position of the subject image 120 is further moved upward by $\Delta y'$ within the display region 300 accordingly in Step S109 and Step S110. A dashed line shown in FIG. 8 indicates the position of the subject image 120 which is not yet changed and thus is the same as in FIG. 7. Such a process is repeated until the record region center C accords with the imaging-region center O (Yes in Step S111).

Figure 9:
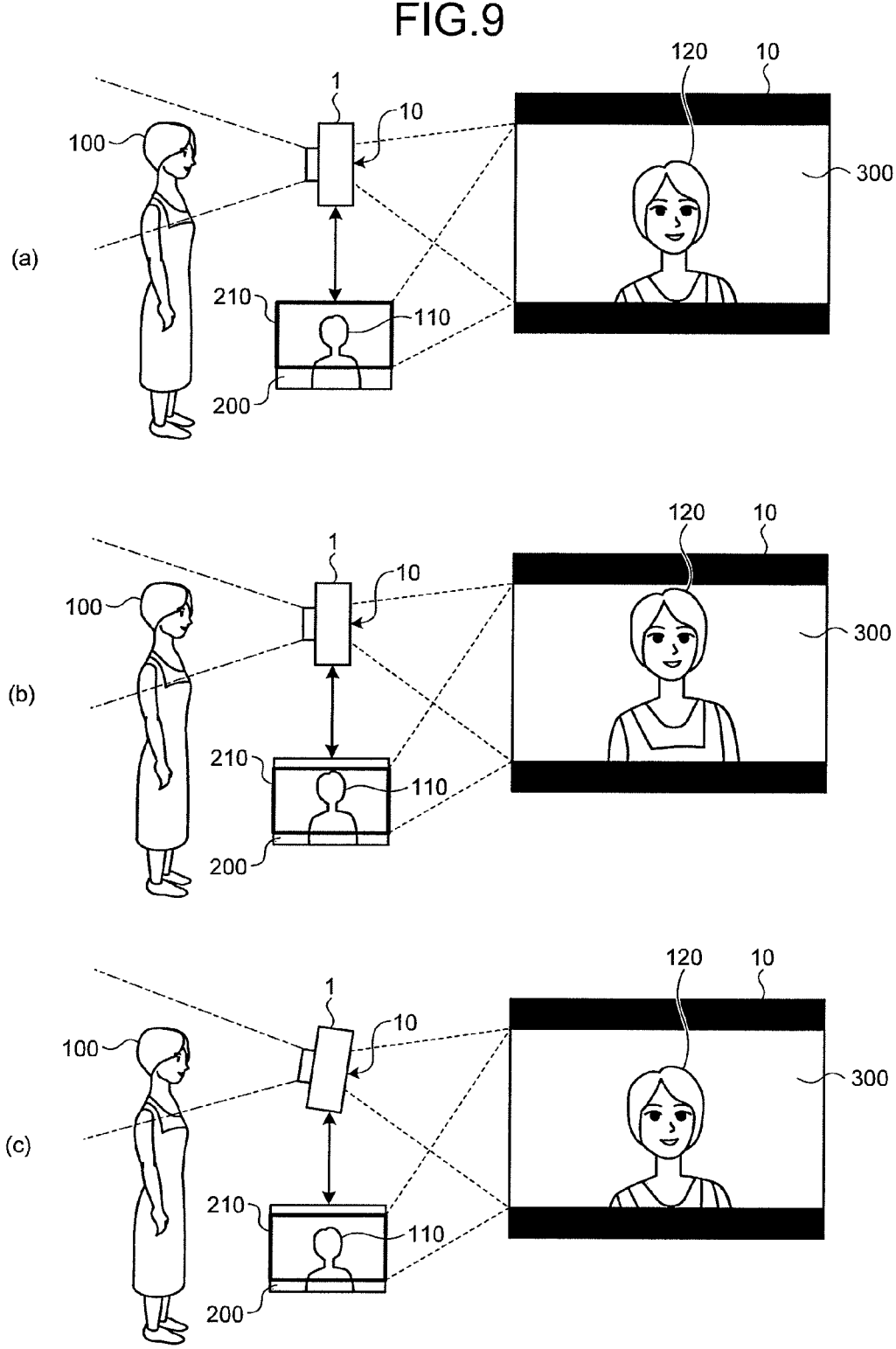
FIG. 9 illustrates a relationship between a field angle of the imaging apparatus and the image displayed on the display unit after the moving image starts to be captured.

FIG. 9 illustrates a relationship between the field angle of the imaging apparatus 1 and the subject image 120 displayed in the display region 300. FIG. 9(a) to (c) is shown in time sequence. In FIG. 9(a), an image is shown immediately after the capturing of the moving image starts. At this time, as shown in FIG. 9(a), for example, the record region 210 is set on the upper side of the imaging-region image 200 in accordance with the position of the subject image 110. Therefore, the face of the subject image 120 is located nearly at the center of the display region 300 in the Y-axis direction. Thereafter, when the record region 210 is gradually moved downward with the field angle of the imaging apparatus 1 fixed with respect to a subject 100, as shown in FIG. 9(b), the subject image 120 is gradually moved upward in the display region 300. At this time, the photographer notices the movement of the subject image 120 and corrects the field angle of the imaging apparatus 1 with respect to the subject 100 in accordance with the movement speed (for example, displaces the imaging apparatus upward), as shown in FIG. 9(c), the subject image 110 comes to be put within a desired range of the record region 210 and thus the subject image 120 can be located at an appropriate position of the display region 300. Thus, the photographer can correct the field angle of the imaging apparatus 1 more rapidly by moving the image on the display region 300.

Figure 10:
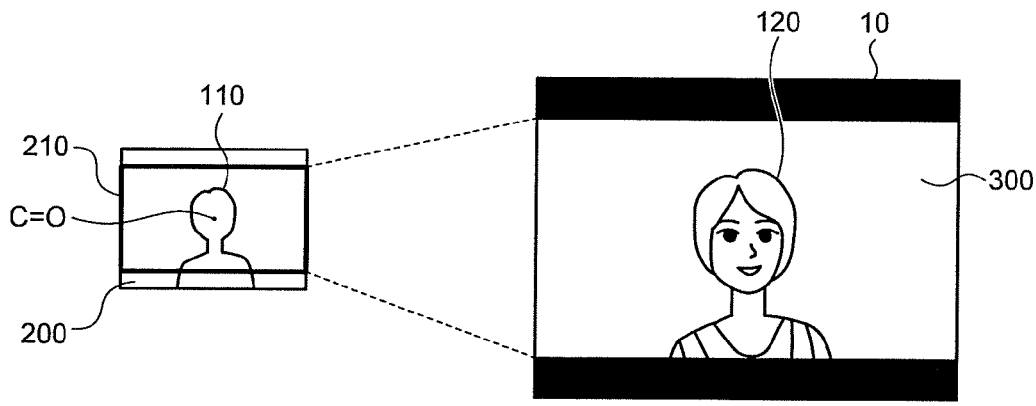
FIG. 10 is a diagram schematically illustrating a relationship between the imaging-region image and the image displayed on the display unit after the moving image is captured.

When the record region center C accords with the imaging-region center O (Yes in Step S111), as shown in FIG. 10, the imaging apparatus 1 continues capturing the moving image in the state of C=O (No in Step S113). When a signal giving an instruction to end the capturing of the moving image is input in Step S113 (Yes in Step S113), the imaging apparatus 1 ends the capturing of the moving image.

Here, the movement amount $\Delta y$ of the record region center C set in Step S112 may be an amount by which the photographer can notice the movement of the subject image 120 so as to correct the field angle of the imaging apparatus 1 and adjust the position of the subject image 120. Specifically, a time t from when the moving image starts to be captured (that is, when $C_Y = A_Y$ is set) to when the record region center C accords with the imaging-region center O may be, for example, about 2 seconds. In this case, on the assumption that $\Delta P$ (pixel) denotes the interval between the record region center C and the imaging-region center O at the time when the moving image just started to be captured and R(fps) denotes a frame rate, the record region center C may be moved only by $\Delta y = \Delta P/t \cdot R = \Delta P/2R$ per frame.

Figure 11:
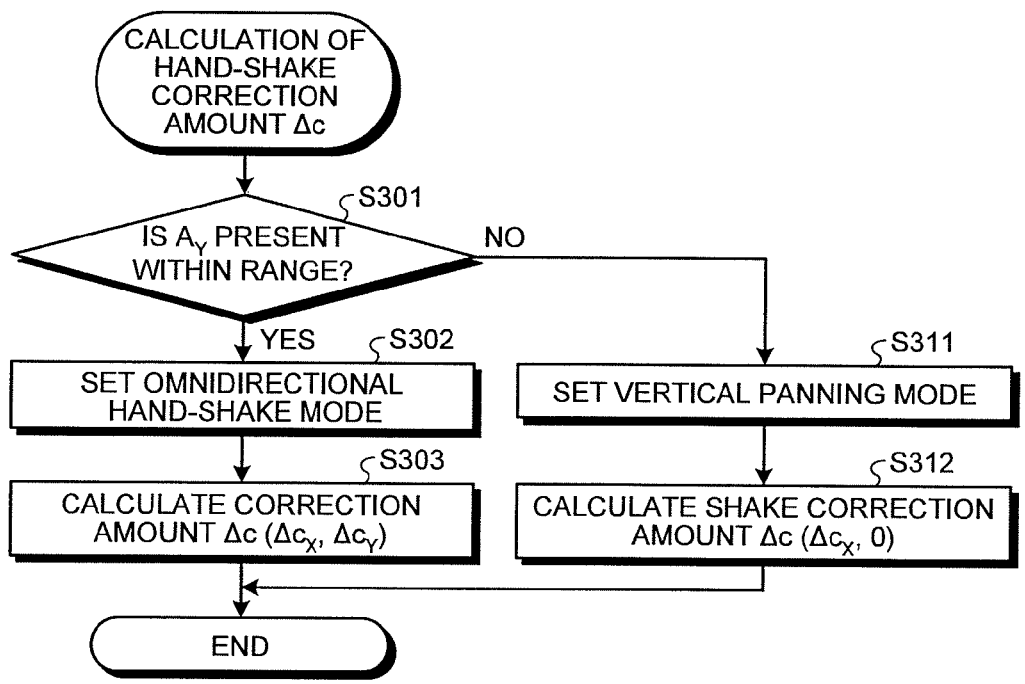
FIG. 11 is a flowchart illustrating an operation of calculating a hand-shake correction amount in electronic hand-shake correction mode.

Next, a calculation operation (Step S300) of the hand-shake correction amount $\Delta c$ will be described when the electronic hand-shake correction mode is in ON (Yes in Step S104). FIG. 11 is a flowchart illustrating the calculation operation of the hand-shake correction amount Δc.

In Step S301, the correction mode control unit 17m first determines whether the Y coordinate $C_Y$ of the record region center C is present within a range expressed by Inequality (3) below. In Inequality (3), $\Delta G_Y$ denotes the size of a record region 220 in the Y-axis direction and $\Delta B_Y$ denotes the size of a shake correction region 230 in the Y-axis direction.

$$|C_Y| \leq (\Delta S_Y/2) - \Delta B_Y - (\Delta G_Y/2) \quad (3)$$

Figure 12:
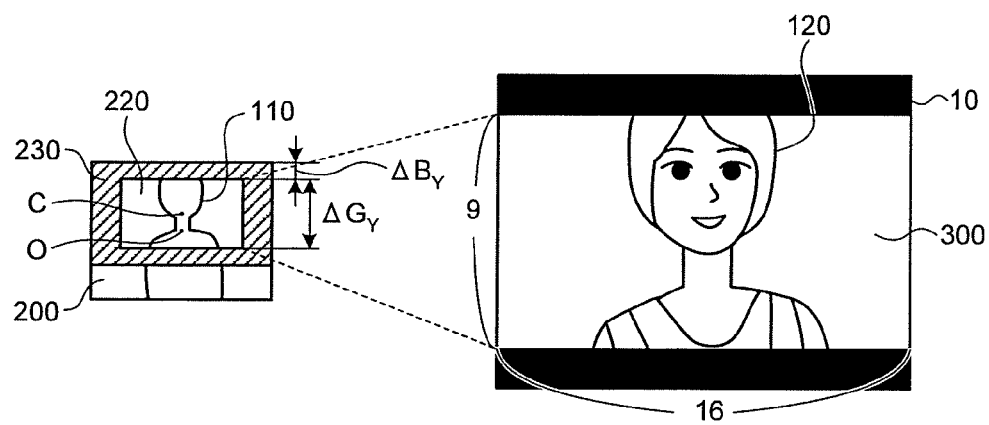
FIG. 12 is a diagram illustrating an electronic hand-shake correction mode performed at the time of capturing the moving image.

The reason for performing such determination is as follows. That is, when the electronic hand-shake correction mode is made effective, as shown in FIG. 12, a margin (shake correction region) 230 of correction pixels is normally set around the record region 220. Thus, the record region 220, itself, can be narrowed and the range where the record region 220 can be set can also be narrowed. For example, even when the subject image 110 is pictured at the end (for example, the upper end) of the imaging-region image 200, the upper end of the record region 220 may not be set to match with the upper end of the imaging-region image 200. Therefore, as shown in FIG. 12, the upper portion of the face of the subject image 120 may be cut in the display region 300. Due to this reason, the correction mode control unit 17m determines whether there is sufficient room for the shake correction region 230 in all of the sides including the upper and lower sides of the record region 220 by Inequality (3).

Figure 13:
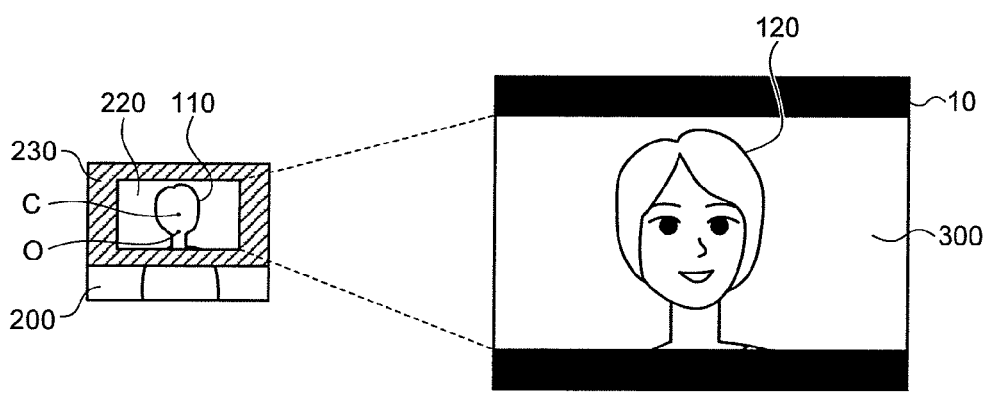
FIG. 13 is a diagram schematically illustrating a relationship between the imaging-region image and the image displayed on the display unit when the omnidirectional hand-shake correction mode is effective.

When the Y coordinate $C_Y$ of the record region center C is present within the range indicated by Inequality (3) (Yes in Step S301), as shown in FIG. 13, the correction mode control unit 17m determines that the shake correction region 230 can be sufficiently formed in all of the sides including the upper and lower sides of the record region 220. In Step S302, the omnidirectional hand-shake correction mode is set. In Step S303, the electronic hand-shake correction unit 17k calculates the hand-shake correction amount $\Delta c(\Delta c_X, \Delta c_Y)$ in the X-axis and Y-axis directions.

Figure 14:
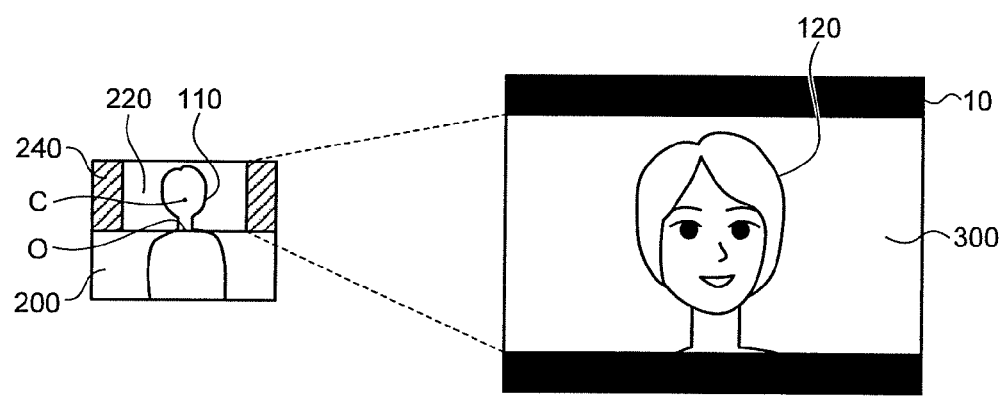
FIG. 14 is a diagram schematically illustrating a relationship between the imaging-region image and the image displayed on the display unit when a vertical camera-movement capturing mode is effective.

On the other hand, when the coordinate $C_Y$ of the record region center C is not present within the range indicated by Inequality (3) (No in Step S301), as shown in FIG. 14, the correction mode control unit 17m determines that the shake correction region may not be sufficiently formed in the upper and lower sides of the record region 220. In Step S311, a vertical panning mode is set so that a shake correction region 240 is formed only in the right and left sides of the record region 220. In this case, the electronic hand-shake correction in the X-axis direction is made effective. In Step S312, the electronic hand-shake correction unit 17k calculates the shake correction amount $\Delta c(\Delta c_X, 0)$.

After Step S303 or S312, the operation of the imaging apparatus 1 proceeds to Step S106.

Figure 15:
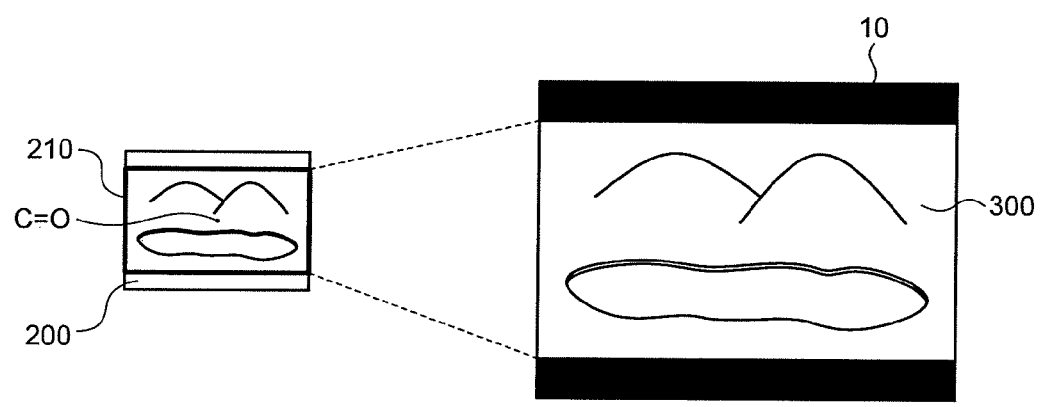
FIG. 15 is a diagram schematically illustrating a relationship between the imaging-region image and the image displayed on the display unit when no subject is detected at the beginning of capturing the moving image.

Next, the operation of the imaging apparatus 1 will be described when no target subject is detected in Step S101 (No in Step S101). For example, when a distant landscape is captured, no specific target subject is detected. In this case, as shown in FIG. 15, the record region center C is first set to the imaging-region center O. Thus, an image formed by cutting both the upper and lower portions of the imaging-region image 200 is equally displayed in the display region 300.

According to this embodiment, as described above, the record image is set in accordance with the position of the subject image on the imaging-region image when the moving image capturing mode starts. Therefore, the photographer can continue capturing a desired subject together with the record region displayed on the display unit from the beginning of capturing the moving image. According to this embodiment, since the record region set in this manner is gradually moved up to the center region of the originally used imaging-region image, the photographer can adjust the field angle of the imaging apparatus 1 little by little to locate the subject to a desired position, while observing the movement of the subject displayed on the display unit.

Moreover, according to this embodiment, since the effective range (all directions or only the horizontal direction) of the electronic hand-shake correction mode is controlled in accordance with the position of the subject image, the necessary record region can be ensured. Even when the hand-shake correction is set only in the horizontal direction, the correction mode is automatically changed at the time when the hand-shake correction is possible in all directions by adjusting the field angle. Accordingly, the moving image can be captured in the state where the hand-shake is reduced.

In the above-described embodiment, the target subject to be detected is mainly set to the face of a person, but other target subjects may be set. Specifically, the target subject may be a person (its whole body), an animal (its whole body or its face), a moving vehicle, an object tracked by auto focus (AF) lock, or the like. For example, when a small animal such as a dog is set as a target subject, the target subject detection unit 17f may detect the eyes and nose of the dog and sets the central position of a triangle binding the two eyes and the nose as the subject center A.

In the above description, the processing has been described when the still image capturing mode in which the vertical-to-horizontal ratio of an image is 3/4 is switched to the moving image capturing mode in which the vertical-to-horizontal ratio of an image is 9/16. However, the vertical-to-horizontal ratio of an image is not limited to the above numerical values. Moreover, application of this embodiment is not limited to the switching of the capturing mode. That is, this embodiment may be applicable to various kinds of processing as long as the processing involves the change of the vertical-to-horizontal ratio of an image. For example, in this embodiment, the record region is moved in the vertical direction since the capturing mode is switched from the still image capturing mode using a large vertical-to-horizontal image ratio to the moving image capturing mode using a small vertical-to-horizontal image ratio (that is, since the image is cut in the vertical direction). Conversely, the record region may be moved in the horizontal direction when the capturing mode is switched from a mode using a small vertical-to-horizontal image ratio to a mode using a large vertical-to-horizontal image ratio.

Second Embodiment

Figure 16:
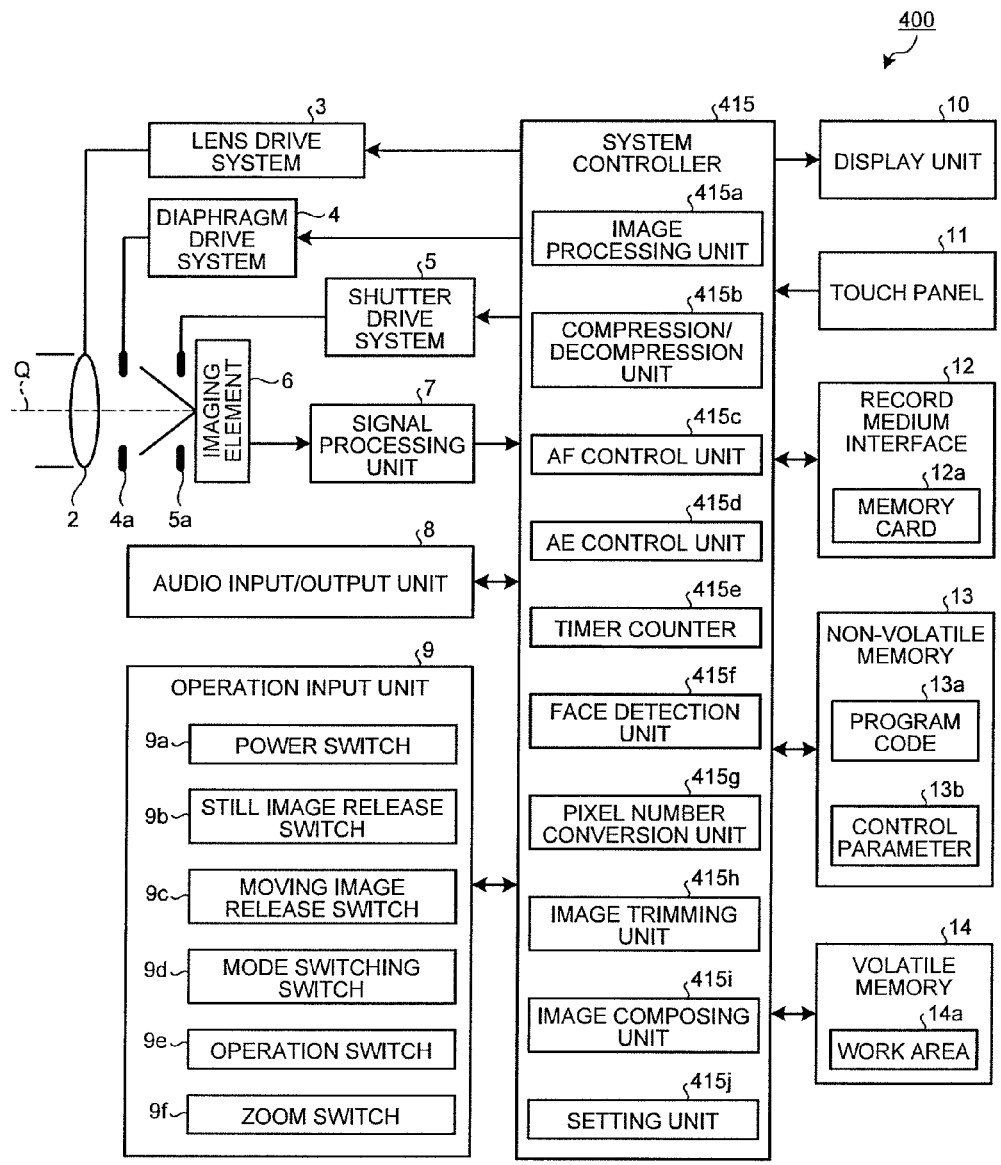
FIG. 16 is a block diagram illustrating the configuration of an imaging apparatus according to a second embodiment of the invention.

Next, a second embodiment of the invention will be described. FIG. 16 is a block diagram illustrating the configuration of an imaging apparatus according to the second embodiment. In FIG. 16, the same reference numerals denote the constituent elements having the same configuration as that of the imaging apparatus 1 explained in the above-described first embodiment and the description thereof will not be repeated. In the following description, it is assumed that a still image capturing mode is a first capturing mode and a moving image capturing mode is a second capturing mode. Moreover, in the following description, it is assumed that a first vertical-to-horizontal ratio is a first ratio and a second vertical-to-horizontal ratio is a second ratio.

As shown in FIG. 16, an imaging apparatus 400 includes a lens unit 2, a lens drive system 3, a diaphragm drive system 4, a shutter drive system 5, an imaging element 6, a signal processing unit 7, an audio input/output unit 8, an operation input unit 9, a display unit 10, a touch panel 11, a record medium interface 12, a non-volatile memory 13, a volatile memory 14, and a system controller 415.

The system controller 415 is configured by a CPU or the like. The system controller 415 reads the program from the non-volatile memory 13 in response to an operation signal from the operation input unit 9 to execute the program, and gives an instruction to each of the units of the imaging apparatus 400 or transmits data to control the operation of the imaging apparatus 400 as a whole. The system controller 415 includes an image processing unit 415a, a compression/decompression unit 415b, an AF control unit 415c, an AE control unit 415d, a timer counter 415e, a face detection unit 415f, a pixel number conversion unit 415g, an image trimming unit 415h, an image composing unit 415i, and a setting unit 415j.

The image processing unit 415a performs various kinds of image processing on the image data output from the signal processing unit 7 and outputs the processed image data to the volatile memory 14. Specifically, the image processing unit 415a performs processing such as edge enhancement, color correction, or γ correction on the image data output from the signal processing unit 7.

The compression/decompression unit 415b compresses or decompresses the image data in accordance with a JPEG compression method or the like, when the image data stored in the work area 14a of the volatile memory 14 is stored in the memory card 12a or the image data stored in the memory card 12a is displayed on the display unit 10.

The AF control unit 415c performs automatic focus adjustment based on the image data output from the signal processing unit 7. For example, the AF control unit 415c drives the lens drive system 3 based on the contrast of the image data and moves the lens unit 2 along the optical axis Q so that the sharpness of a subject image captured can be the maximum.

The AE control unit 415d performs automatic exposure by determining conditions such as a set value of the diaphragm 4a and a shutter speed during capturing the still image based on the image data output from the signal processing unit 7.

The timer counter 415e generates a time signal serving as a reference of the operation of the imaging apparatus 400. Based on the time signal, the system controller 415 sets an acquisition interval of the image data, an exposure time of the imaging element 6, and the like.

The face detection unit 415f detects the face of a subject included in the image corresponding to the image data output from the signal processing unit 7 by pattern matching or the like. In the second embodiment, the face detection unit 415f detects the face of a person. However, the face detection unit 415f may detect the face of an animal such as a dog or a cat.

The pixel number conversion unit 415g converts the image data output from the signal processing unit 7 into data with the number of pixels in accordance with various kinds of capturing modes of the imaging apparatus 400. Specifically, the pixel number conversion unit 415g converts the image data into data with the number of pixels in accordance with a still image capturing mode or a moving image capturing mode.

The image trimming unit 415h generates a captured image with a vertical-to-horizontal ratio between a first ratio 3/4 (corresponding to an aspect ratio of 3:4) and a second ratio 9/16 (corresponding to an aspect ratio of 9:16) by trimming the image included in the image data generated by the imaging element 6, in which the first ratio is a vertical-to-horizontal ratio at the time of capturing a still image and the second ratio of a vertical-to-horizontal ratio at the time of capturing a moving image. Specifically, the first ratio is a ratio corresponding to the aspect ratio of 3:4 (480×640 pixels) and the second ratio is a ratio corresponding to the aspect ratio of 9:16 (1080×1920 pixels).

The image composing unit 415i generates a composite image of which the vertical-to-horizontal ratio is the same as the second ratio as a whole by adding an auxiliary image with a vertical-to-horizontal ratio the same as that of the captured image that is generated by the image trimming unit 415h to the captured image.

The setting unit 415j sets change timing of the vertical-to-horizontal ratio of the captured image generated by the image trimming unit 415h. Specifically, the setting unit 415j sets the change timing of the vertical-to-horizontal ratio of the captured image generated by the image trimming unit 415h based on the operation contents input through the operation switch 9e by a photographer.

The system controller 415 including the above-described units performs control of reducing with time the vertical-to-horizontal ratio of the captured images generated through the sequential image trimming by the image trimming unit 415h, from the first ratio to the second ratio, when a change instruction signal (a first release signal giving an instruction to prepare the moving image capturing mode) to change the vertical-to-horizontal ratio of the image being captured is input through the moving image release switch 9c, during capturing the still image. Moreover, the system controller 415 causes the image composing unit 415i to generate a composite image until the vertical-to-horizontal ratio of the captured image generated by the image trimming unit 415h becomes the second ratio, when a capturing instruction signal (a second release signal giving an instruction to capture a moving image) to capture the moving image is input through the moving image release switch 9c during the change of the vertical-to-horizontal ratio of the captured images generated by the image trimming unit 415h. In the second embodiment, the system controller 415 functions as a control unit.

Figure 17:
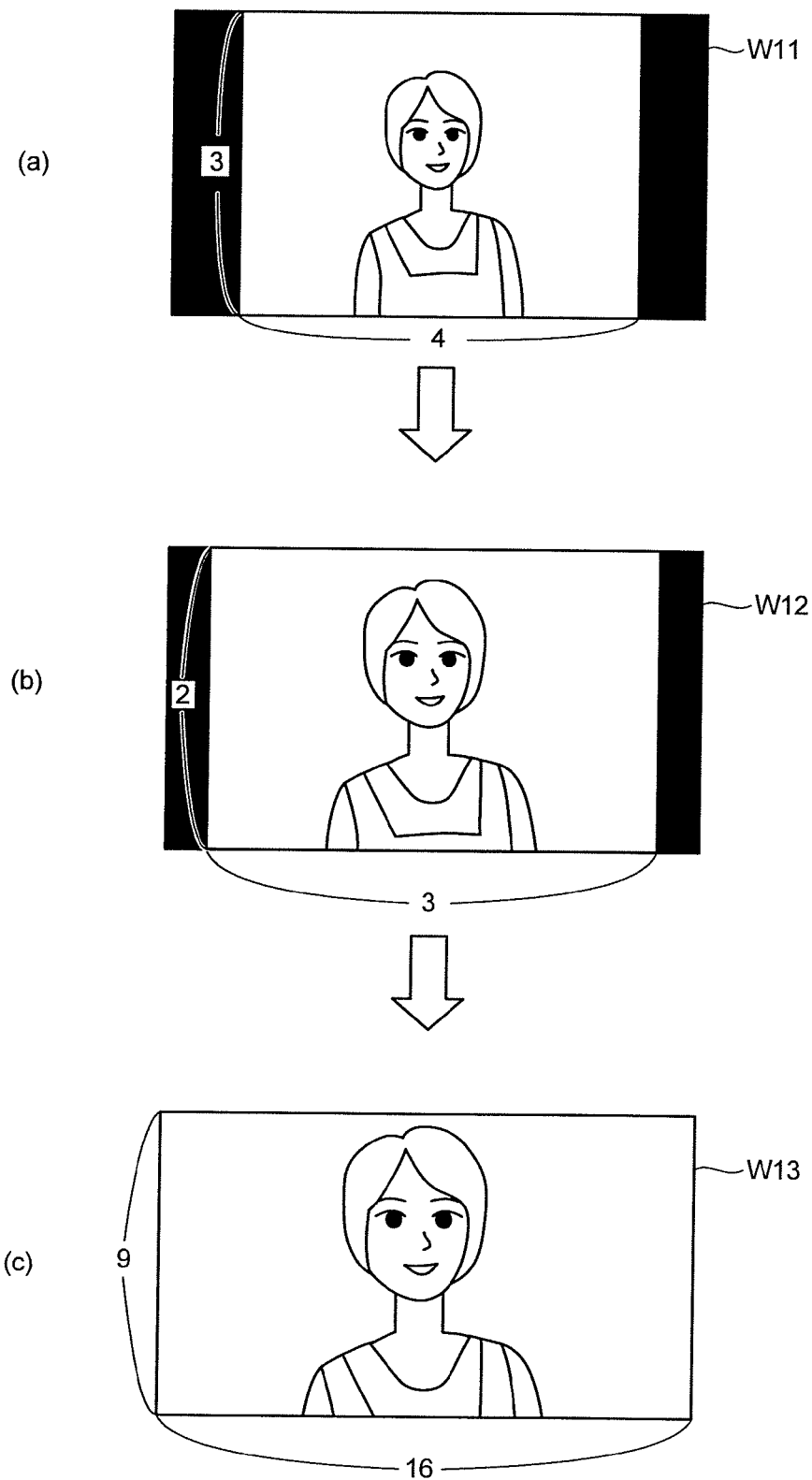
FIG. 17 illustrates an example of an image displayed on the display unit when a photographer presses halfway a moving image release switch while the imaging apparatus captures a still image according to the second embodiment of the invention.

An overview of processing of the imaging apparatus 400 having the above-described configuration will be described for a case in which a photographer presses halfway the moving image release switch 9c during capturing the still image. FIG. 17 illustrates an example of an image displayed on the display unit 10 when a photographer presses halfway the moving image release switch 9c while the imaging apparatus 400 captures a still image according to the second embodiment of the invention. In FIG. 17, three representative images W11 to W13 (shown in FIG. 17(a) to (c), respectively) are shown among a plurality of images displayed on the display unit 10. A plurality of images are present between the images W11 and W12 and between the images W12 and W13.

Referring to FIG. 17, the image W11 shown in FIG. 17(a) is an image which is obtained during capturing the still image and has a vertical-to-horizontal ratio represented by the first ratio. The image W12 shown in FIG. 17(b) is an image where a vertical-to-horizontal ratio is represented by an aspect ratio of 2:3. The image W13 shown in FIG. 17(c) is an image which is obtained during capturing the moving image and has a vertical-to-horizontal ratio represented by the second ratio. In FIG. 17, the vertical-to-horizontal ratios of the images W11 to W13 are in the relationship of "9/16<2/3<3/4".

As shown in FIG. 17, the system controller 415 performs control of reducing with time the vertical-to-horizontal ratio of the captured images generated through the sequential image trimming by the image trimming unit 415h, from the first ratio to the second ratio (in order of the image W11, the image W12, and the image W13) when the change instruction signal to change the vertical-to-horizontal ratio of the image being captured is input through the moving image release switch 9c during capturing the still image. Thereafter, the system controller 415 starts the moving image capturing of chronologically storing the captured images with the second ratio generated continuously by the image trimming unit 415h in the work area 14a of the volatile memory 14, when the capturing instruction signal for the moving image capturing mode is input through the moving image release switch 9c. Then, in the imaging apparatus 400, the system controller 415 makes the aspect ratio of an image gradually reach the aspect ratio for the moving image capturing mode instead of abruptly changing the aspect ratio, when the system controller 415 starts capturing a moving image with an aspect ratio different from that of the previous one during capturing the still image. Therefore, the photographer can have a sufficient time to adjust the composition of the subject. Accordingly, it is possible to prevent the moving image capturing mode from starting with an unintended composition, for example, a composition in which a subject is present outside a capturing region.

Figure 18:
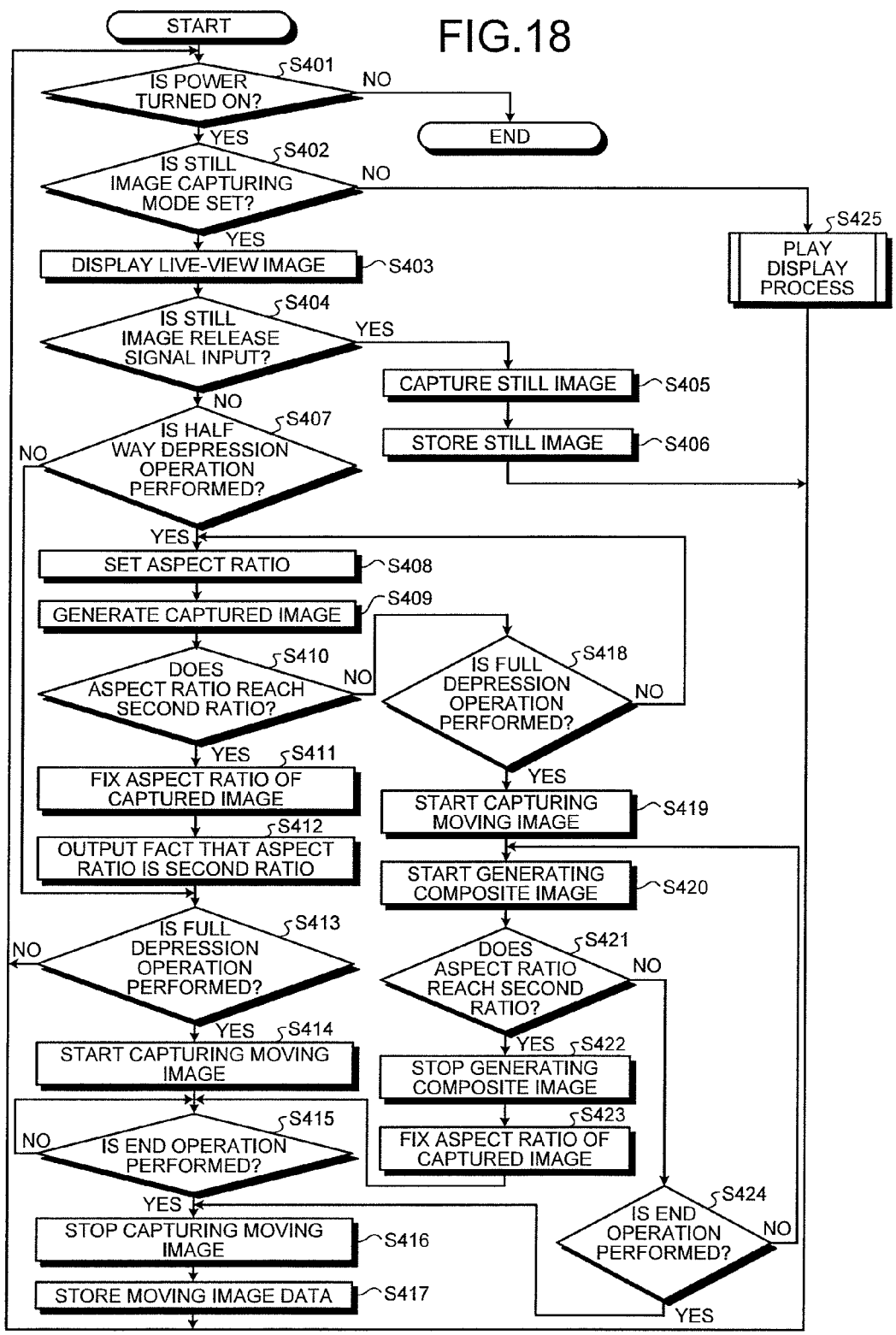
FIG. 18 is a flowchart illustrating an overview of processing performed by the imaging apparatus according to the second embodiment of the invention.

Next, the processing performed by the imaging apparatus 400 will be described according to the second embodiment. FIG. 18 is a flowchart illustrating the overview of the processing performed by the imaging apparatus 400 according to the second embodiment of the invention.

As shown in FIG. 18, in Step S401, the system controller 415 first determines whether the imaging apparatus 400 is turned on. When the imaging apparatus 400 is turned on (Yes in Step S401), the imaging apparatus 400 causes the control to proceed to Step S402. On the other hand, when the imaging apparatus 400 is not turned on (No in Step S401), the imaging apparatus 400 ends the process.

In Step S402, the system controller 415 determines whether the imaging apparatus 400 is set in the still image capturing mode. Specifically, the system controller 415 determines whether the imaging apparatus 400 is in the still image capturing mode in which the vertical-to-horizontal ratio of an image is the first ratio at the time of capturing the still image. When the system controller 415 determines whether the imaging apparatus 400 is in the still image capturing mode (Yes in Step S402), the imaging apparatus 400 causes the control to proceed to Step S403. On the other hand, when the system controller 415 determines whether the imaging apparatus 400 is not in the still image capturing mode (No in Step S402), the imaging apparatus 400 causes the control to proceed to Step S425 described below.

First, the case will be described in which the imaging apparatus 400 is in the still image capturing mode (Yes in Step S402). In this case, in Step S403, the display unit 10 displays a live-view image corresponding to the image data continuously generated at a constant fine interval by the imaging element 6. The vertical-to-horizontal ratio of the live-view image is the first ratio (for example, see the image W11 shown in FIG. 17(a)).

In Step S404, the system controller 415 determines whether the photographer operates (fully presses) the still image release switch 9b and a release signal for still image capturing mode is input. When the release signal for the still image capturing mode is input (Yes in Step S404), the imaging apparatus 400 causes the control to proceed to Step S405. On the other hand, when the release signal for the still image capturing mode is input (No in Step S404), the imaging apparatus 400 causes the control to proceed to Step S407.

First, the case will be described in which the release signal for the still image capturing mode is input (Yes in Step S404). In this case, the system controller 415 captures the live-view image being currently displayed on the display unit 10 and temporarily stores, in the work area 14a of the volatile memory 14, the captured images with the first ratio that the image trimming unit 415h generates by trimming the image included in the image data generated by the imaging element 6 in Step S405. Then, the imaging apparatus 400 causes the control to proceed to Step S406.

In Step S406, the system controller 415 causes the compression/decompression unit 415b to compress the captured image with the first ratio stored in the work area 14a and stores the captured image in the memory card 12a. Then, the process proceeds to Step S401.

Next, the case will be described in which the photographer does not operate the still image release switch 9b (No in Step S404). In this case, in Step S407, the system controller 415 determines whether the photographer presses halfway the moving image release switch 9c. Specifically, the system controller 415 determines whether the moving image release switch 9c outputs the change instruction signal to change the vertical-to-horizontal ratio of the image to the system controller 415 by stopping the pressing of the photographer when the moving image release switch 9c is not fully pressed. When the photographer does not press halfway the moving image release switch 9c (No in Step S407), the imaging apparatus 400 causes the control to proceed to Step S413 described below. On the other hand, when the photographer presses halfway the moving image release switch 9c (Yes in Step S407), the imaging apparatus 400 causes the control to proceed to Step S408.

In Step S408, the system controller 415 sets the vertical-to-horizontal ratio of the image included in the image data generated by the imaging element 6. In Step S409, the system controller 415 causes the image trimming unit 415h to generate the captured images with the preset vertical-to-horizontal ratio by trimming the image included in the image data generated by the imaging element 6.

Figure 19:
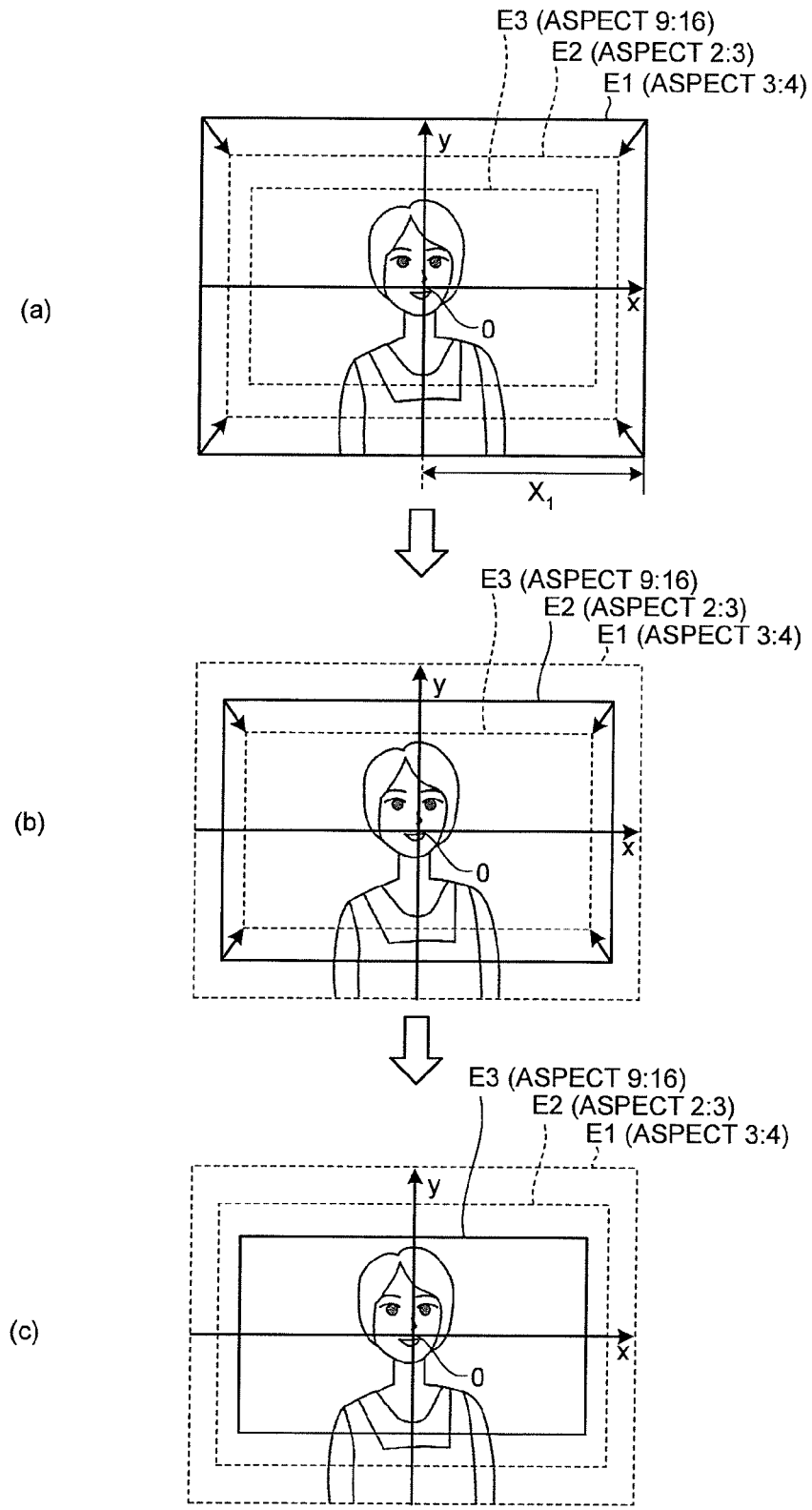
FIG. 19 shows diagrams illustrating a variation in a vertical-to-horizontal ratio of a captured image generated by an image trimming unit of the imaging apparatus according to the second embodiment of the invention.

FIG. 19 illustrates a variation in the vertical-to-horizontal ratio of captured images generated by the image trimming unit 415h. As shown in FIG. 19, the image trimming unit 415h sequentially generates the captured images in order of E1, E2, and E3 with different vertical-to-horizontal ratios while gradually reducing the vertical-to-horizontal ratio of the captured images chronologically (from FIG. 19(a) to FIG. 19(b) to FIG. 19(c)) from the first ratio to the second ratio. Moreover, a plurality of captured images are present between the captured images E1 and E2 and between the captured images E2 and E3.

Figure 20:
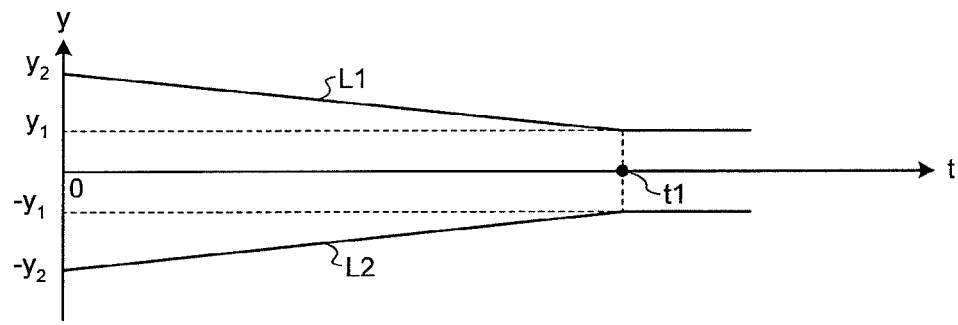
FIG. 20 is a diagram illustrating a relationship between a time and a vertical effective range of the captured image generated by the image trimming unit of the imaging apparatus according to the second embodiment of the invention.

FIG. 20 is a diagram illustrating a relationship between a time and a vertical effective range of the captured image generated by the image trimming unit 415h. In FIG. 20, broken lines L1 and L2 indicate temporal change in the effective range in the vertical direction of the captured image generated by the image trimming unit 415h. In FIG. 20, the horizontal axis represents a time and the vertical axis represents the effective range in the vertical direction of the captured image generated by the image trimming unit 415h.

As shown in FIG. 20, the image trimming unit 415h sets the vertical-to-horizontal ratio of the captured image so as to be gradually chronologically decreases for a preset time $t_1$. First, during a period from a time point 0 to a time point $t_1$, a time rate $\Delta y/\Delta t$ of the change in the effective range in the vertical direction of the captured image that the image trimming unit 415h generates by trimming the image included in the image data generated by the imaging element 6 is:

$$\Delta y/\Delta t = 2(y_1 - y_2)t_1 \qquad (4)$$

Next, the image trimming unit 415h sets a range $x_1$ (see FIG. 19(a)) from the center of the image included in the image data generated by the imaging element 6 to the end of the image in the horizontal direction, sets the first ratio to 3/4, and sets the second ratio to 9/16. For this case, effective ranges $2y_1$ and $2y_2$ in the vertical direction of the captured image are:

$$y_1 = (9/8) \cdot x_1 \quad (5)$$

$$y_2 = (3/2) \cdot x_1 \quad (6)$$

Here, when Equations (5) and (6) are substituted for the right side of Equation (4), Equation (7) below is established.

$$\Delta y / \Delta t = -3x_1 / 8t_1 \quad (7)$$

The image trimming unit 415$h$ changes the vertical-to-horizontal ratio of the captured image within the preset time t1 such as 2 seconds and sets the effective range in the vertical direction of the captured image. The above definition of the time rate of change in the effective range in the vertical direction of the captured image generated by the image trimming unit 415$h$ is just an example. For example, the time rate of change in the effective range in the vertical direction of the captured image generated by the image trimming unit 415$h$ may be changed in stepwise manner. Moreover, the time rate of change may be set using a quadratic function or a logarithmic function.

In Step S410, the system controller 415 determines whether the vertical-to-horizontal ratio of the captured image generated by the image trimming unit 415$h$ reaches the second ratio. When the system controller 415 determines that the vertical-to-horizontal ratio of the captured image reaches the second ratio (Yes in Step S410), the imaging apparatus 400 causes the control to proceed to Step S411. On the other hand, when the system controller 415 determines that the vertical-to-horizontal ratio of the captured image does not reach the second ratio (No in Step S410), the imaging apparatus 400 causes the control to proceed to Step S418 described below.

The case in which the vertical-to-horizontal ratio of the captured image reaches the second ratio (Yes in Step S410) will be described first. In this case, in Step S411, the system controller 415 fixes, to the second ratio, the vertical-to-horizontal ratio of the captured image generated by the image trimming unit 415$h$, and then the imaging apparatus 400 causes the control to proceed to Step S412.

In Step S412, the system controller 415 causes the audio input/output unit 8 to output the fact that the vertical-to-horizontal ratio of the captured image generated by the image trimming unit 415$h$ reaches the second ratio. Specifically, the audio input/output unit 8 outputs, by means of audio or the like, the fact that the vertical-to-horizontal ratio of the captured image reaches the second ratio. In the second embodiment, as well as the audio, a message or a flashing indicating the fact that the vertical-to-horizontal ratio of the captured image generated by the image trimming unit 415$h$ reaches the second ratio may be output to the screen of the display unit 10. Thus, the photographer can notice that the vertical-to-horizontal ratio of the captured image generated by the image trimming unit 415$h$ reaches the second ratio.

In Step S413, the system controller 415 determines whether the photographer fully presses the moving image release switch 9$c$. Specifically, the system controller 415 determines whether the capturing instruction signal for the moving image capturing mode is input through the moving image release switch 9$c$. When the system controller 415 determines that the photographer does not fully press the moving image release switch 9$c$ (No in Step S413), the imaging apparatus 400 returns the control to Step S401. In this case, the system controller 415 may cancel the preparation for the moving image capturing mode and return the control to Step S401 to capture a still image when the photographer presses halfway the moving image release switch 9$c$.

On the other hand, when the system controller 415 determines that the photographer fully presses the moving image release switch 9$c$ (Yes in Step S413), the imaging apparatus 400 causes the control to proceed to Step S414.

In Step S414, the system controller 415 starts the moving image capturing mode to temporarily chronologically store the captured images with the second ratio continuously generated at a constant fine interval by the image trimming unit 415$h$ in the work area 14$a$.

In Step S415, the system controller 415 determines whether the photographer executes an operation of ending the moving image capturing mode. Specifically, the system controller 415 determines whether the photographer operates the moving image release switch 9$c$ again. When the system controller 415 determines that the photographer does not execute the operation of ending the moving image capturing mode (No in Step S415), the imaging apparatus 400 repeats this determination to continue the moving image capturing mode. On the other hand, when the system controller 415 determines that the photographer executes the operation of ending the moving image capturing mode (Yes in Step S415), the imaging apparatus 400 causes the control to proceed to Step S416.

In Step S416, the system controller 415 stops the moving image capturing mode in which the captured images with the second ratio continuously generated at a constant fine interval by the image trimming unit 415$h$ are temporarily chronologically stored in the work area 14$a$.

The system controller 415 causes the compression/decompression unit 415$b$ to compress the series of captured images stored in the work area 14$a$. In Step S417, the system controller 415 stores the compressed captured images as moving image data in the memory card 12$a$ and the imaging apparatus 400 returns the control to Step S401.

Next, the case will be described in which the vertical-to-horizontal ratio of the captured image does not reach the second ratio (No in Step S410). In this case, in Step S418, the system controller 415 determines whether the photographer fully presses the moving image release switch 9$c$. When the system controller 415 determines that the photographer does not fully press the moving image release switch 9$c$ (No in Step S418), the imaging apparatus 400 returns the control to Step S408 to repeat the processes until the vertical-to-horizontal ratio of the captured image generated by the image trimming unit 415$h$ satisfies a predetermined ending condition. Specifically, the image trimming unit 415$h$ continues generating the captured images while reducing the vertical-to-horizontal ratio of the image with time, from the first ratio to the second ratio until the vertical-to-horizontal ratio of the image reaches the second ratio. On the other hand, when the system controller 415 determines that the photographer fully presses the moving image release switch 9$c$ (Yes in Step S418), the imaging apparatus 400 causes the control to proceed to Step S419.

In Step S419, the system controller 415 starts the moving image capturing mode in which the captured images with the second ratio continuously generated at a constant fine interval by the image trimming unit 415$h$ are temporarily chronologically stored in the work area 14$a$. Then, the imaging apparatus 400 causes the control to proceed to Step S420.

In Step S420, the image composing unit 415$i$ starts generating a composite image with a vertical-to-horizontal ratio which accords with the second ratio by adding an auxiliary image to the captured image in accordance with the vertical-to-horizontal ratio of the captured image generated by the image trimming unit 415$h$. In this case, the composite images are sequentially and chronologically stored in the work area 14$a$.

Figure 21:
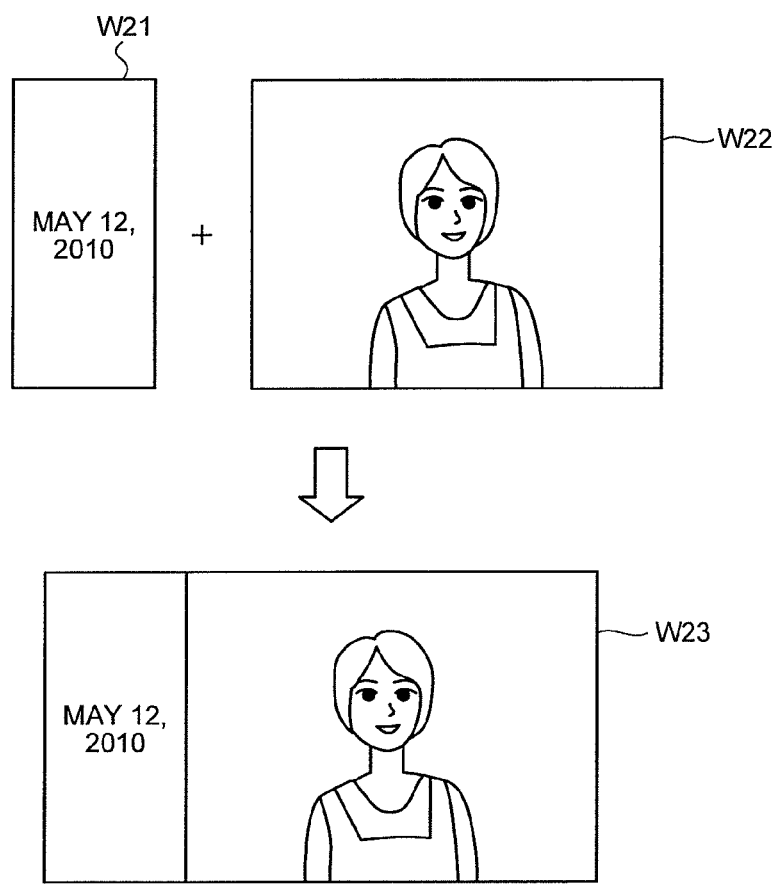
FIG. 21 is a diagram schematically illustrating a method of generating a composite image generated by an image composing unit of the imaging apparatus according to the second embodiment of the invention.

FIG. 21 is a diagram schematically illustrating a method of generating a composite image generated by the image composing unit 415i. As shown in FIG. 21, the image composing unit 415i generates a composite image W23 with a vertical-to-horizontal ratio which accords with the second ratio by adding an auxiliary image W21 to the captured image W22 in accordance with the vertical-to-horizontal ratio of the captured image W22 generated by the image trimming unit 415h. Specifically, the composite image W23 has a rectangular shape and the vertical length of the auxiliary image W21 is equal to the vertical length of the captured image W22. In the second embodiment, the image composing unit 415i may generate the composite image with a vertical-to-horizontal ratio which accords with the second ratio by sequentially composing the captured images continuously chronologically generated by the image trimming unit 415h on a mount corresponding to the captured image with the second ratio.

In Step S421, the system controller 415 determines whether the vertical-to-horizontal ratio of the captured image generated by the image trimming unit 415h reaches the second ratio. When the system controller 415 determines that the vertical-to-horizontal ratio of the captured image reaches the second ratio (Yes in Step S421), the imaging apparatus 400 causes the control to proceed to Step S422. On the other hand, when the system controller 415 determines that the vertical-to-horizontal ratio of the captured image does not reach the second ratio (No in Step S421), the imaging apparatus 400 causes the control to proceed to Step S424.

First, the case will be described in which the vertical-to-horizontal ratio of the captured image generated by the image trimming unit 415h reaches the second ratio (Yes in Step S421). In this case, in Step S422, the system controller 415 stops generating the composite images sequentially generated by the image composing unit 415i and the imaging apparatus 400 causes the control to proceed to Step S423.

In Step S423, the system controller 415 fixes, to the second ratio, the vertical-to-horizontal ratio of the captured image generated by the image trimming unit 415h and the imaging apparatus 400 causes the control to proceed to Step S415.

Next, the case will be described in which the vertical-to-horizontal ratio of the captured image generated by the image trimming unit 415h does not reach the second ratio (No in Step S421). In this case, in Step S424, the system controller 415 determines whether the photographer executes an operation of ending the moving image capturing mode. When the system controller 415 determines that the photographer executes the operation of ending the moving image capturing mode (Yes in Step S424), the imaging apparatus 400 causes the control to proceed to Step S416. On the other hand, when the system controller 415 determines that the photographer does not execute the operation of ending the moving image capturing mode (No in Step S424), the imaging apparatus 400 returns the control to Step S420.

The case will be described in which the imaging apparatus 400 is set in the still image capturing mode in Step S402 (No in Step S402). In this case, in Step S425, the system controller 415 performs the play display process and the imaging apparatus 400 returns the control to Step S401.

Figure 22:
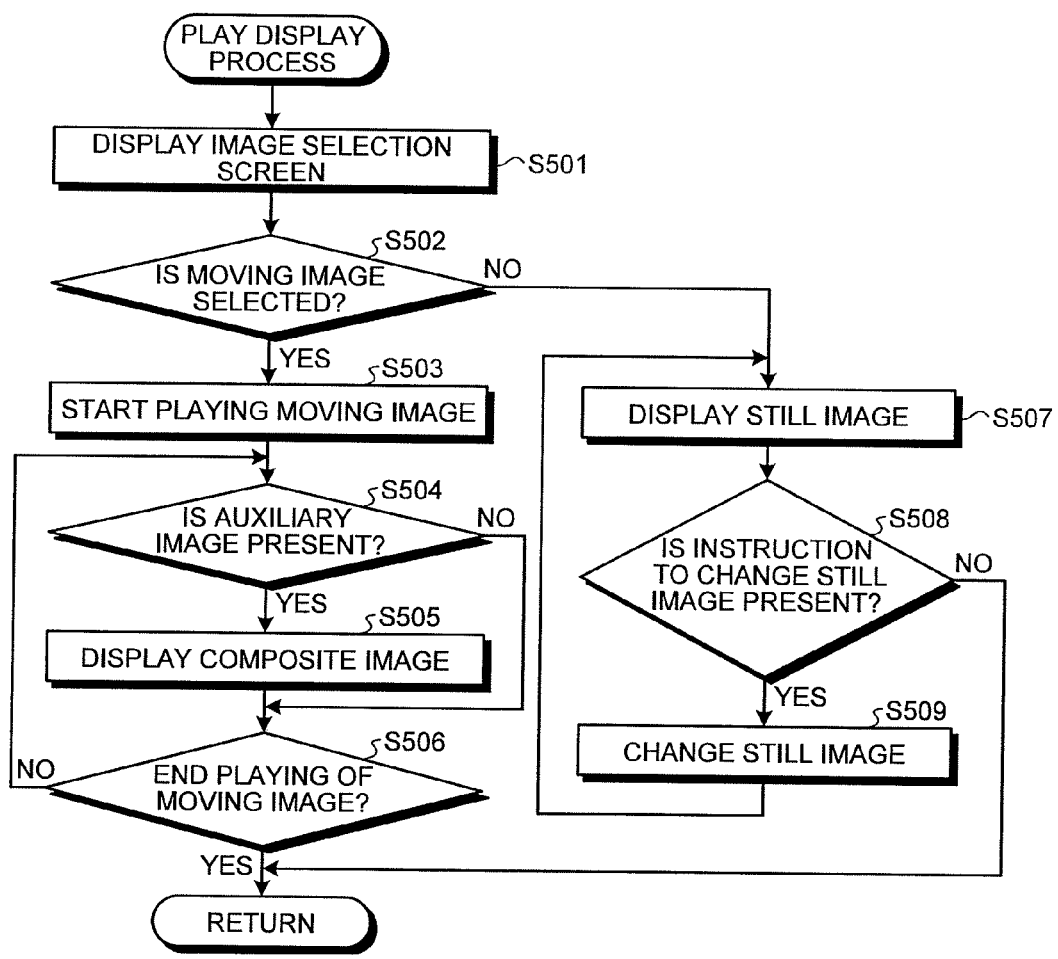
FIG. 22 is a flowchart illustrating an overview of a play display process of FIG. 18.

FIG. 22 is a flowchart illustrating the overview of a play display process of FIG. 18. In Step S501, as shown in FIG. 22, the system controller 415 displays an image selection screen on the display unit 10 to display the plurality of images or moving images stored in the memory card 12a.

In Step S502, the system controller 415 determines whether the photographer selects a moving image in the image selection screen displayed on the display unit 10. When the system controller 415 determines that the photographer selects a moving image (Yes in Step S502), the imaging apparatus 400 causes the control to proceed to Step S503. On the other hand, when the system controller 415 determines that the photographer does not select a moving image (No in Step S502), the imaging apparatus 400 causes the control to proceed to Step S507.

First, the case will be described in which the system controller 415 determines that the photographer selects a moving image in the image selection screen displayed on the display unit 10 (Yes in Step S502). In this case, the system controller 415 allows the compression/decompression unit 415b to compress the moving image data stored in the memory card 12a and displays the moving image data on the screen of the display unit 10 to start playing the moving image in Step S503. Then, the imaging apparatus 400 causes the control to proceed to Step S504.

In Step S504, the system controller 415 determines whether the auxiliary images are added to images which are the series of moving image data displayed on the display unit 10 and are scheduled to be continuously and chronologically displayed. When the system controller 415 determines whether the auxiliary images are added (Yes in Step S504), the system controller 415 displays the composite images obtained by adding the auxiliary images to the images displayed on the display unit 10 in Step S505.

FIG. 23 illustrates an example of an image displayed by the display unit 10. In FIG. 23, three representative images W31 to W33 (shown in FIG. 23(a) to (c), respectively) are shown among the plurality of images displayed on the display unit 10.

The plurality of images are present between the images W31 and W32 and between the images W32 and W33. As shown in FIG. 23, the display unit 10 displays the composite image, such as the image W31 or W32 obtained by adding the auxiliary image to the image being displayed. In this case, the system controller 415 includes the auxiliary image included in the composite image in the end of the screen of the display unit 10 and displays the auxiliary image on the display unit 10. Thus, since the auxiliary image is added to the moving image being played, a viewer can watch the moving image pleasantly, compared to a case where the moving image is monotonously played. For example, the photographer can input and generate the contents or kinds of the auxiliary image being displayed with the operation switch 9e and stores the contents or kinds of the auxiliary image in the memory card 12a.

On the other hand, when the system controller 415 determines that the auxiliary images are not added to images which are the series of moving image data displayed on the display unit 10 and are scheduled to be continuously and chronologically displayed (No in Step S504), the imaging apparatus 400 causes the control to proceed to Step S506.

In Step S506, the system controller 415 determines whether the series of moving image data displayed on the display unit 10 ends. When the system controller 415 determines that the series of moving image data does not end (No in Step S506), the imaging apparatus 400 returns the process to Step S504 and continues playing the moving image. On the other hand, when the system controller 415 determines that the series of moving image data ends (Yes in Step S506), the imaging apparatus 400 returns the control to the main routine.

Next, the case will be described in which the moving image is not selected in the image selection screen displayed on the display unit 10 (No in Step S502). In this case, the system controller 415 allows the compression/decompression unit 415b to compress the still image data stored in the memory card 12a. In Step S507, the system controller 415 displays the compressed still image data on the screen of the display unit 10 and the imaging apparatus 400 causes the control to proceed to Step S508.

In Step S508, the system controller 415 determines whether the photographer operates the operation switch 9e and inputs an instruction signal to change the still image being currently displayed on the display unit 10. When the system controller 415 determines that the instruction signal used to change the still image is input (Yes in Step S508), the system controller 415 changes the still image being displayed on the display unit 10 in Step S509. Then, the imaging apparatus 400 returns the process to Step S507. On the other hand, when the system controller 415 determines that the instruction signal used to change the still image is not input (No in Step S508), the imaging apparatus 400 returns the process to the main routine.

In the second embodiment described above, the system controller 415 decreases the vertical-to-horizontal ratio of the captured image generated by sequentially trimming the image by the image trimming unit 415h with time from the first ratio to the second ratio, when the moving image release switch 9c inputs the change instruction signal to change the vertical-to-horizontal ratio of the image being captured during capturing the still image. As a consequence, when the moving image with a different aspect ratio is captured during capturing the still image, it is possible to prevent the moving image from being captured from the unintended composition of the photographer. The photographer can operate the composition of the imaging apparatus 400 before a subject gets out of the capturing region, since the system controller 415 gradually changes the vertical-to-horizontal ratio of the captured image generated by the image trimming unit 415h. Therefore, it is possible to prevent the subject from getting out of the capturing region. When the photographer presses the moving image release switch 9c during the change in the vertical-to-horizontal ratio of the captured image generated by the image trimming unit 415h, the system controller 415 starts the moving image capturing mode to temporarily store, in the work area 14a, the captured images generated by sequentially trimming the images by the image trimming unit 415h. Accordingly, it is possible to instantly start capturing a moving image.

In the second embodiment, the first ratio which is the vertical-to-horizontal ratio of the image at the time of capturing the still image is 3/4 (corresponding to the aspect ratio of 3:4). However, the first ratio may be, for example, 2/3 (corresponding to the aspect ratio of 2:3). More generally, the first ratio may be greater than the second ratio.

In the second embodiment, the system controller 415 reduces the vertical-to-horizontal ratio of the captured image generated by the image trimming unit 415h chronologically with time, from the first ratio to the second ratio. However, for example, the vertical-to-horizontal ratio of the captured image may be changed with time step by step.

In the second embodiment, an input of the change instruction signal is received to give an instruction to change the vertical-to-horizontal ratio of the image when the photographer presses halfway the moving image release switch 9c, whereas an input of the capturing instruction signal is received to capture a moving image when the photographer fully presses the moving image release switch 9c. However, for example, a change switch may independently be installed to receive an input of the change instruction signal used to give an instruction to change the vertical-to-horizontal ratio of the image and a moving image capturing switch may independently be installed to receive an input of the capturing instruction signal used to capture a moving image.

In the second embodiment, the system controller 415 decreases the vertical-to-horizontal ratio of the captured image generated by the image trimming unit 415h with time from the second ratio to the first ratio when the photographer presses halfway the moving image release switch 9c. Thereafter, the system controller 415 releases the preparation for the moving image capturing mode to return to the still image capturing mode, when the photographer presses halfway the moving image release switch 9c again. However, for example, the system controller 415 may decrease the vertical-to-horizontal ratio of the captured image generated by the image trimming unit 415h with time from the first ratio to the second ratio when the photographer continuously processes halfway the moving image release switch 9c. The system controller 415 may cancel the preparation for the moving image capturing mode to return to the still image capturing mode, when the photographer stops the half pressing of the moving image release switch 9c.

In the second embodiment, the setting unit 415j sets the change timing of the vertical-to-horizontal ratio of the captured image generated by the image trimming unit 415h in accordance with the operation contents of the operation switch 9e of the photographer. However, for example, the change timing of the vertical-to-horizontal ratio of the captured image generated by the image trimming unit 415h may automatically be set in accordance with the focal distance of a subject, a detection result of the face detection unit 415f, or a capturing situation.

Third Embodiment

Figure 24:
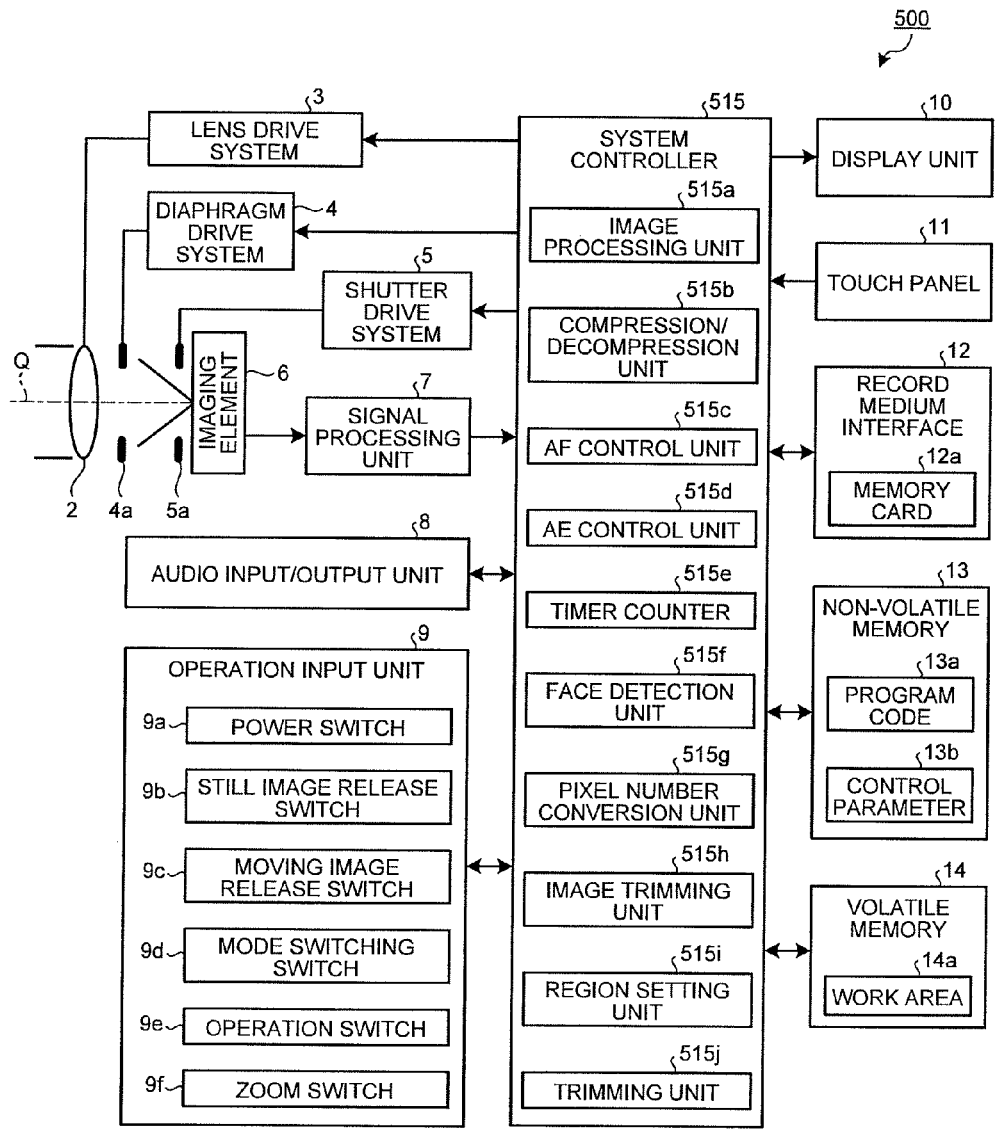
FIG. 24 is a block diagram illustrating the configuration of an imaging apparatus according to a third embodiment of the invention.

Next, a third embodiment of the invention will be described. FIG. 24 is a block diagram illustrating the configuration of an imaging apparatus according to the third embodiment of the invention. In FIG. 24, the same reference numerals are given to the constituent units having the same configuration as that of the imaging apparatus explained in the above-described first embodiment and the description thereof will not be repeated.

As shown in FIG. 24, an imaging apparatus 500 includes a lens unit 2, a lens drive system 3, a diaphragm drive system 4, a shutter drive system 5, an imaging element 6, a signal processing unit 7, an audio input/output unit 8, an operation input unit 9, a display unit 10, a touch panel 11, a record medium interface 12, a non-volatile memory 13, a volatile memory 14, and a system controller 515.

The system controller 515 is configured by a CPU or the like. The system controller 515 reads the program from the program code 13a of the non-volatile memory 13 in response to an operation signal from the operation input unit 9 to execute the program, and gives an instruction to each of the units of the imaging apparatus 500 or transmits data to control the operation of the imaging apparatus 500 as a whole. The system controller 515 includes an image processing unit 515a, a compression/decompression unit 515b, an AF control unit 515c, an AE control unit 515d, a timer counter 515e, a face detection unit 515f, a pixel number conversion unit 515g, an image trimming unit 515h, a region setting unit 515i, and a trimming unit 515j.

The image processing unit 515a performs various kinds of image processing on the image data output from the signal processing unit 7 and outputs the processed image data to the volatile memory 14. Specifically, the image processing unit 515a performs processing such as edge enhancement, color correction, or γ correction on the image data output from the signal processing unit 7.

The compression/decompression unit 515b compresses or decompresses the image data in accordance with a JPEG compression method or the like, when the image data stored in the work area 14a of the volatile memory 14 is stored in the memory card 12a or the image data stored in the memory card 12a is displayed on the display unit 10.

The AF control unit 515c performs automatic focus adjustment based on the image data output from the signal processing unit 7. For example, the AF control unit 515c drives the lens drive system 3 based on the contrast of the image data and moves the lens unit 2 along the optical axis Q so that the sharpness of a subject image being captured is the maximum.

The AE control unit 515d performs automatic exposure by determining conditions such as a set value of the diaphragm 4a and a shutter speed at the time of capturing a still image based on the image data output from the signal processing unit 7.

The timer counter 515e generates a time signal serving as a reference of the operation of the imaging apparatus 500. Based on the time signal, the system controller 515 sets an acquisition interval of the image data, an exposure time of the imaging element 6, and the like.

The face detection unit 515f detects the face of a subject included in the image corresponding to the image data output from the signal processing unit 7 by pattern matching or the like. In the third embodiment, the face detection unit 515f detects the face of a person. However, the face detection unit 515f may detect the face of an animal such as a dog or a cat.

The pixel number conversion unit 515g converts the image data output from the signal processing unit 7 into data with the number of pixels in accordance with various kinds of capturing modes of the imaging apparatus 500. Specifically, the pixel number conversion unit 515g converts the image data into data with the number of pixels in accordance with a still image capturing mode or a moving image capturing mode.

The image trimming unit 515h generates a captured image with a vertical-to-horizontal ratio between a first ratio 3/4 (corresponding to an aspect ratio of 3:4) and a second ratio 9/16 (corresponding to an aspect ratio of 9:16) by trimming the image included in the image data generated by the imaging element 6 in which the first ratio is a vertical-to-horizontal ratio of an image at the time of capturing a still image, and the second ratio is a vertical-to-horizontal ratio of an image at the time of capturing a moving image and is less than the first ratio.

The region setting unit 515i sets a fixation region, in which the vertical-to-horizontal ratio is fixed in the region of the captured image generated by the image trimming unit 515h, and a conversion region, in which a vertical-to-horizontal ratio is converted.

The trimming unit 515j generates a trimming image in which a vertical-to-horizontal ratio of the entire image including the fixation region is the second ratio, by converting the vertical-to-horizontal ratio of the conversion region set by the region setting unit 515i.

When an instruction to capture a moving image is input through the moving image release switch 9c during capturing the still image, the system controller 515 including the above-described units performs control of chronologically reducing the vertical-to-horizontal ratio of the conversion region set by the region setting unit 515i, fixes the vertical-to-horizontal ratio of the conversion region at the time when the vertical-to-horizontal ratio of the entire image including the fixation region and the conversion region becomes the second ratio, and stores the image data of the captured image generated after this time as moving image data in the volatile memory 14. Moreover, the system controller 515 sets, as the fixation region, a region including at least the face region of a subject detected in the region of the captured image, which is generated by the image trimming unit 515h, by the face detection unit 515f. In the third embodiment, the system controller 515 functions as a control unit.

Figure 25:
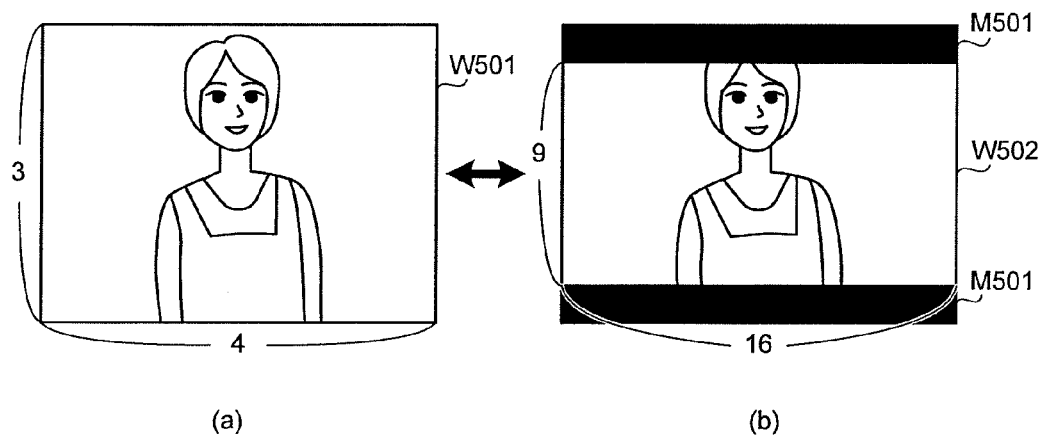
FIG. 25 illustrates an example of a vertical-to-horizontal ratio of an image generated when the imaging apparatus captures a still image or a moving image according to the third embodiment of the invention.

The vertical-to-horizontal ratio of the image will be described which is generated in the still image capturing mode or the moving image capturing mode by the imaging apparatus 500 having the above-described configuration. FIG. 25 illustrates an example of a vertical-to-horizontal ratio of an image generated when the imaging apparatus 500 captures a still image or a moving image. In FIG. 25, an image W501 shown in FIG. 25(a) is an image in which a vertical-to-horizontal ratio is the first ratio of the first embodiment at the time of capturing a still image. An image W502 shown in FIG. 25(b) is an image in which a vertical-to-horizontal ratio is the second ratio of the third embodiment at the time of capturing a moving image. The second ratio is set to be less than the first ratio. Specifically, the first ratio is a ratio corresponding to the aspect ratio of 3:4 (480×640 pixels) and the second ratio is a ratio corresponding to the aspect ratio of 9:16 (1080×1920 pixels).

When the photographer operates the moving image release switch 9c during capturing the still image, the imaging apparatus 500 instantly starts capturing the moving image irrespective of the fact that the vertical-to-horizontal ratio of the still image is different from the vertical-to-horizontal ratio of the moving image. For this reason, the moving image may start to be captured from the unintended composition (angle) of the photographer, and thus a desired region of the photographer may get out of the image. Specifically, as shown in FIG. 25, a head part of the face of a subject gets out of the image W502 and may be formed in a mask region M1 which is not the capturing region of the imaging element 6.

In order to prevent such a situation, in the third embodiment, the system controller 515 sets the face region of the subject detected within the region of the captured image, which is generated by the image trimming unit 515h, by the face detection unit 515f as a fixation region including at least the face region. Thereafter, when the moving image release switch 9c inputs an instruction to capture a moving image during capturing the still image, the system controller 515 performs control to chronologically decrease the vertical-to-horizontal ratio of the conversion region set by the region setting unit 515i, fixes the vertical-to-horizontal ratio of the conversion region at the time, at which the vertical-to-horizontal ratio of the entire image including the fixation region and the conversion region becomes the second ratio, and stores the image data of the captured image generated after this time as moving image data in the memory card 12a.

FIG. 26 illustrates a variation in the vertical-to-horizontal ratio of a captured image generated by an image trimming unit 515h of the imaging apparatus 500. In FIG. 26, when the moving image release switch 9c inputs an instruction to capture the moving image during capturing the still image, four representative captured images W511 to W514 (shown in FIGS. 26(a) to (d), respectively) are shown among the captured images generated at a vertical-to-horizontal ratio between the first and second ratios by the image trimming unit 515h. A plurality of captured images are present between the respective captured images W511 to W514.

When the photographer operates (presses) the moving image release switch 9c during the time at which the imaging apparatus 500 captures the still image (FIG. 26(a)), as shown in FIG. 26, the image trimming unit 515h generates the captured images (in order of the captured image W512, the captured image W513, and the captured image W514) with different vertical-to-horizontal ratios by chronologically decreasing the ratio of the image including the image data generated by the imaging element 6 from the first ratio to the second ratio (from 3/4 to 2/3, to 9/16). Thus, in the imaging apparatus 500, it is possible to prevent the moving image from being captured from the unintended composition of the photographer at the time of capturing the moving image, even when the capturing mode is switched to the moving image capturing mode, in which the vertical-to-horizontal ratio is different, during capturing the still image.

Figure 27:
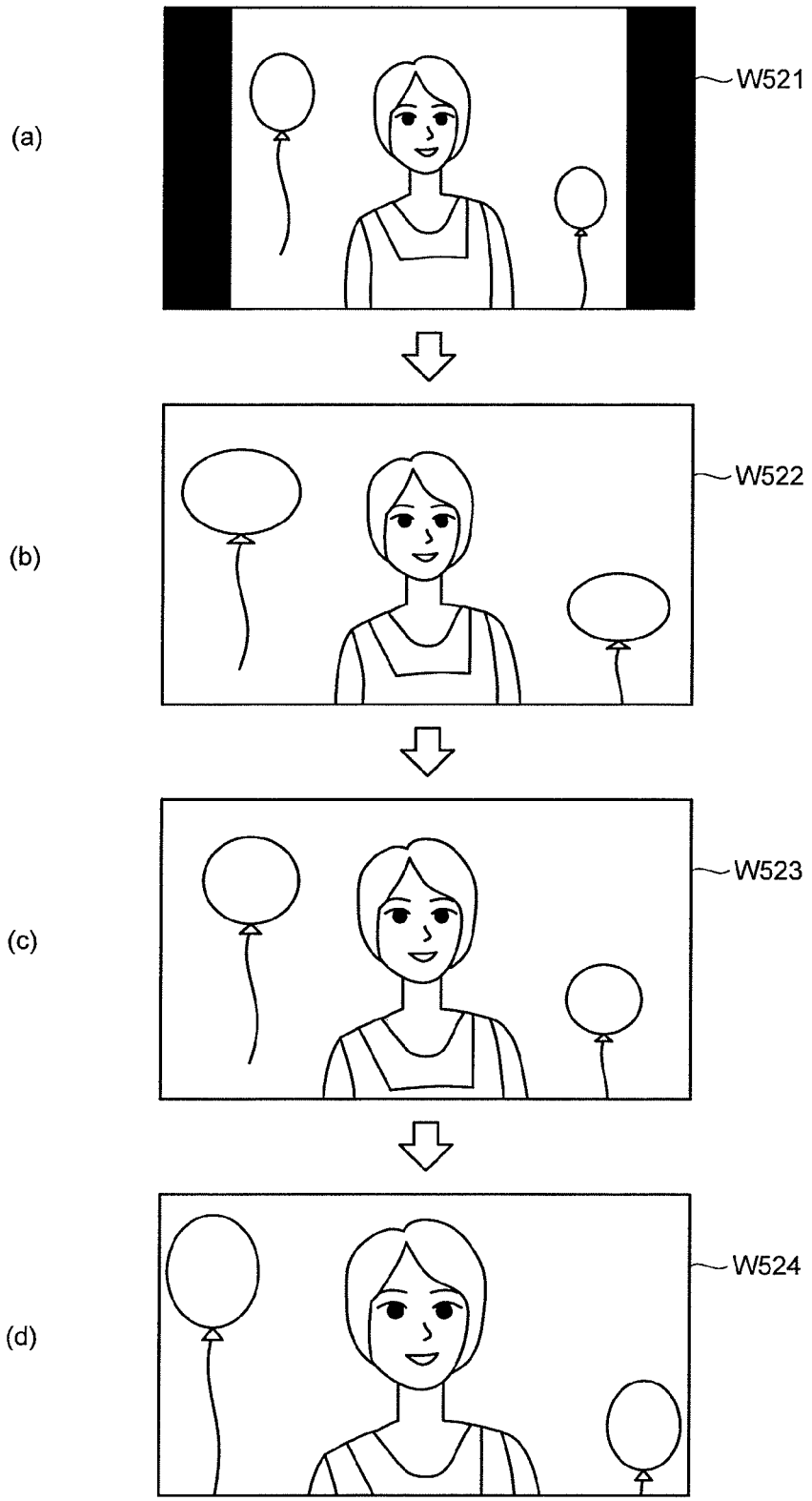
FIG. 27 illustrates an example of an image displayed by the display unit when a capturing mode is switched to a moving image capturing mode in which a vertical-to-horizontal ratio is different from the previous one during capturing a still image according to the third embodiment of the invention.

Here, the image displayed on the display unit 10 will be described when the imaging apparatus 500 switches a capturing mode from a still image capturing mode to a moving image capturing mode. FIG. 27 illustrates an example of an image displayed by the display unit 10 when the capturing mode is switched to the moving image capturing mode in which a vertical-to-horizontal ratio is different while the imaging apparatus 500 captures a still image. In FIG. 27, four representative images W521 to W524 (shown in FIG. 27(*a*) to (*d*), respectively) are shown among the plurality of images displayed on the display unit 10. A plurality of captured images are present between the respective captured images W521 to W524.

When the photographer operates (presses) the moving image release switch 9*c* during the time at which the imaging apparatus 500 captures the still image (FIG. 27(*a*)), as shown in FIG. 27, the display unit 10 displays the images (FIG. 27(*b*) and (*c*)) which accord with the captured image with the second ratio, irrespective of the vertical-to-horizontal ratio of the captured images (see FIG. 26(*a*) to (*b*)) generated by the image trimming unit 515*h*. Thereafter, the display unit 10 displays the captured image (FIG. 26(*d*)) with the second ratio generated in a normal moving image capturing mode from the time at which the vertical-to-horizontal ratio of the captured image generated by the image trimming unit 515*h* becomes the second ratio (FIG. 27(*d*)). Thus, the photographer can adjust the composition of the imaging apparatus 500 to a desired region and capture an image so as not to capture a moving image from an unintended composition, while photographer views the image displayed on the display unit 10.

Figure 28:
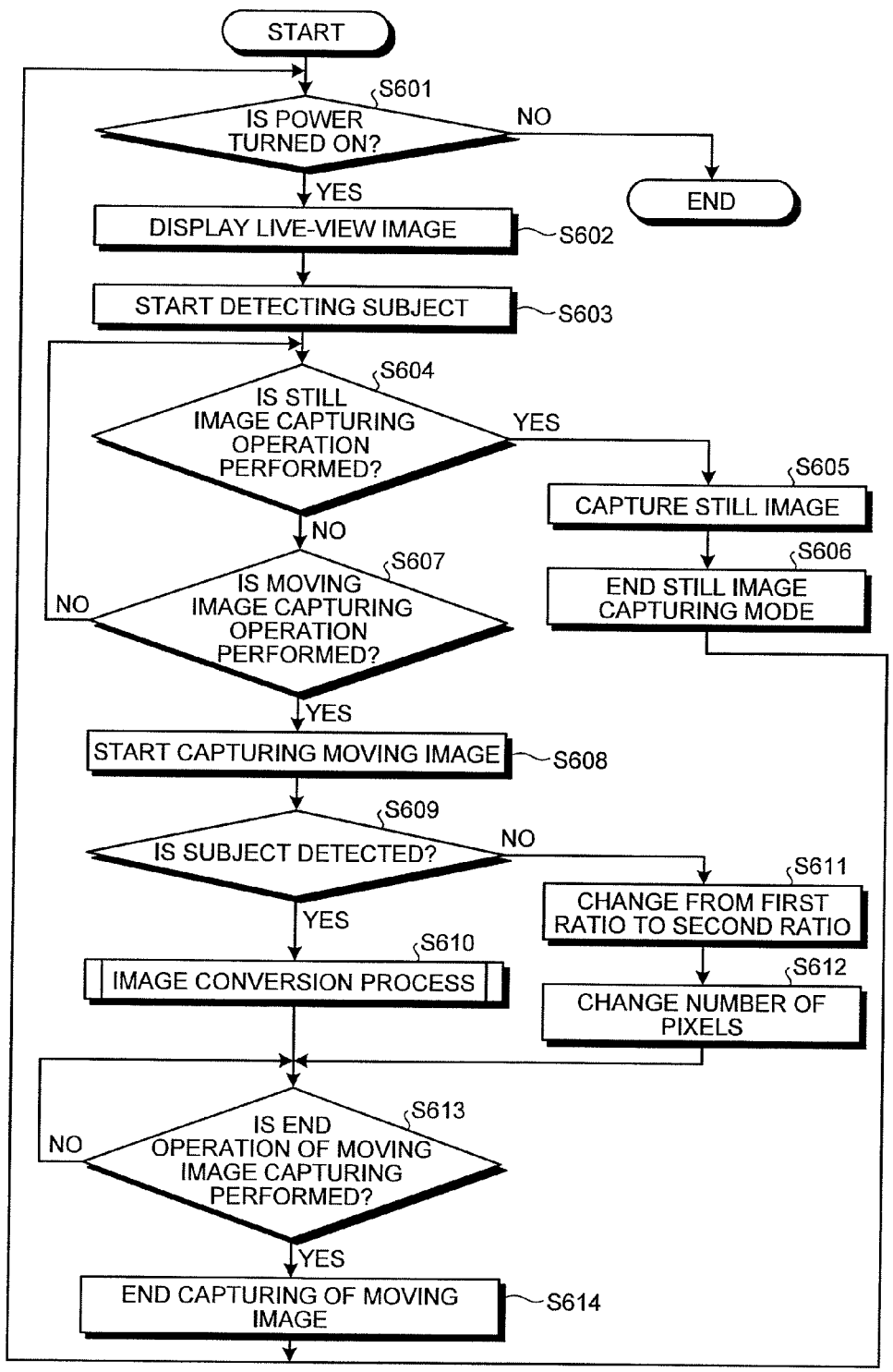
FIG. 28 is a flowchart illustrating an overview of processing performed by the imaging apparatus according to the third embodiment of the invention.

Next, the processing performed by the imaging apparatus 500 will be described according to the third embodiment of the invention. FIG. 28 is a flowchart illustrating the overview of the processing performed by the imaging apparatus 500.

As shown in FIG. 28, in Step S601, the system controller 515 determines whether the imaging apparatus 500 is turned on. When the imaging apparatus 500 is turned on (Yes in Step S601), the imaging apparatus 500 causes the control to proceed to Step S602. On the other hand, when the imaging apparatus 500 is not turned on (No in Step S601), the imaging apparatus 500 ends the process.

In Step S602, the system controller 515 displays a live-view image corresponding to the image data generated by the imaging element 6 on the display unit 10. Specifically, the system controller 515 displays the captured image W521 (with the aspect ratio of 3:4) shown in FIG. 27(*a*) on the display unit 10.

In Step S603, the face detection unit 515*f* starts detecting the face of a subject in the image corresponding to the image data generated by the imaging element 6.

In Step S604, the system controller 515 determines whether the photographer operates the still image release switch 9*b* and the release signal for the still image capturing mode is input. When the system controller 515 determines that the release signal for the still image capturing mode is input (Yes in Step S604), the imaging apparatus 500 causes the control to proceed to Step S605. On the other hand, when the system controller 515 determines that the release signal for the still image capturing mode is not input (No in Step S604), the imaging apparatus 500 causes the control to proceed to Step S607.

First, the case will be described in which the photographer operates the still image release switch 9*b* and the release signal for the still image capturing mode is input (Yes in Step S604). In this case, in Step S605, the system controller 515 captures the live-view image being currently displayed on the display unit 10. Then, the imaging element 6 generates the image, the signal processing unit 7 and the image processing unit 515*a* perform various kinds of image processing on the image data, and the work area 14*a* temporarily stores the processed image data.

In Step S606, the system controller 515 allows the compression/decompression unit 515*b* to compress the image data stored in the work area 14*a* and stores the compressed image data in the memory card 12*a*. Then, the imaging apparatus 500 returns the process to Step S601.

Next, the case will be described in which the photographer does not operate the still image release switch 9*b* (No in Step S604). In this case, in Step S607, the system controller 515 determines whether the photographer operates the moving image release switch 9*c* and the release signal for starting the moving image capturing mode is input. When the system controller 515 determines that the release signal for starting the moving image capturing mode is input (Yes in Step S607), the imaging apparatus 500 causes the control to proceed to Step S608. On the other hand, when the system controller 515 determines that the release signal for starting the moving image capturing mode is not input (No in Step S607), the imaging apparatus 500 returns the process to Step S604.

In Step S608, the system controller 515 starts the moving image capturing mode to temporarily store, in the work area 14*a*, the image data continuously generated at a constant fine interval by the imaging element 6.

In Step S609, the system controller 515 determines whether the face detection unit 515*f* detects the face of the subject in the image corresponding to the image data generated by the imaging element 6. When the system controller 515 determines that the face detection unit 515*f* detects the face of the subject in the image corresponding to the image data generated by the imaging element 6 (Yes in Step S609), the imaging apparatus 500 causes the control to proceed to Step S610. On the other hand, when the system controller 515 determines that the face detection unit 515*f* does not detect the face of the subject in the image corresponding to the image data generated by the imaging element 6 (No in Step S609), the imaging apparatus 500 causes the control to proceed to Step S611.

First, the case will be described in which the face detection unit 515*f* detects the face of the subject in the image corresponding to the image data generated by the imaging element 6 (Yes in Step S609). In this case, in Step S610 the system controller 515 performs an image conversion process described below, and then the imaging apparatus 500 causes the control to proceed to Step S613.

Next, the case will be described in which the face detection unit 515*f* does not detect the face of the subject in the image corresponding to the image data generated by the imaging element 6 (No in Step S609). In this case, in Step S611, the system controller 515 changes, from the first ratio to the second ratio, the vertical-to-horizontal ratio of the captured image that the image trimming unit 515*h* generates by trimming the image included in the image data generated by the imaging element 6. In this case, the work area 14*a* temporarily stores the plurality of captured images continuously generated at a constant fine interval by the image trimming unit 515h.

In Step S612, the system controller 515 changes the number of pixels of the image data changed by the pixel number conversion unit 515g from the number of pixels for the still image capturing mode to the number of pixels for the moving image capturing mode. Then, the imaging apparatus 500 causes the control to proceed to Step S613.

In Step S613, the system controller 515 determines whether an operation of ending the moving image capturing mode is input during capturing the imaging apparatus 500. Specifically, the system controller 515 determines whether the photographer operates the moving image release switch 9c. When the system controller 515 determines that the photographer operates the moving image release switch 9c (Yes in Step S613), the imaging apparatus 500 causes the control to proceed to Step S614. On the other hand, when the system controller 515 determines that the photographer does not operate the moving image release switch 9c (No in Step S613), the imaging apparatus 500 repeats this determination to continue the moving image capturing mode.

In Step S614, the system controller 515 allows the compression/decompression unit 515b to compress the captured images which are the series of moving image data stored in the work area 14a, stores the compressed captured images in the memory card 12a, and ends the moving image capturing mode of the imaging apparatus 500. The imaging apparatus 500 returns the process to Step S601.

Figure 29:
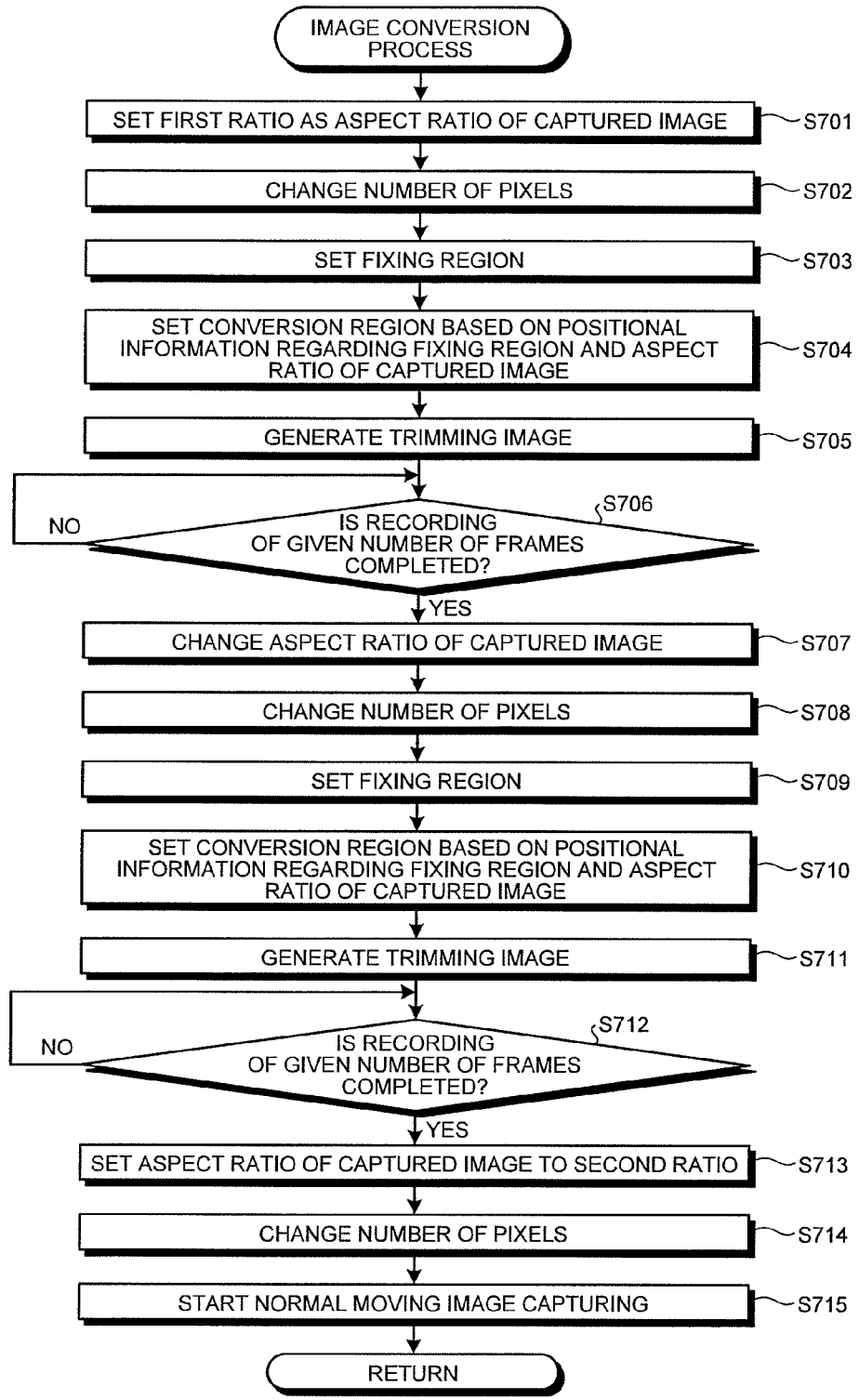
FIG. 29 is a flowchart illustrating an overview of an image conversion process of FIG. 28.
Figure 30:
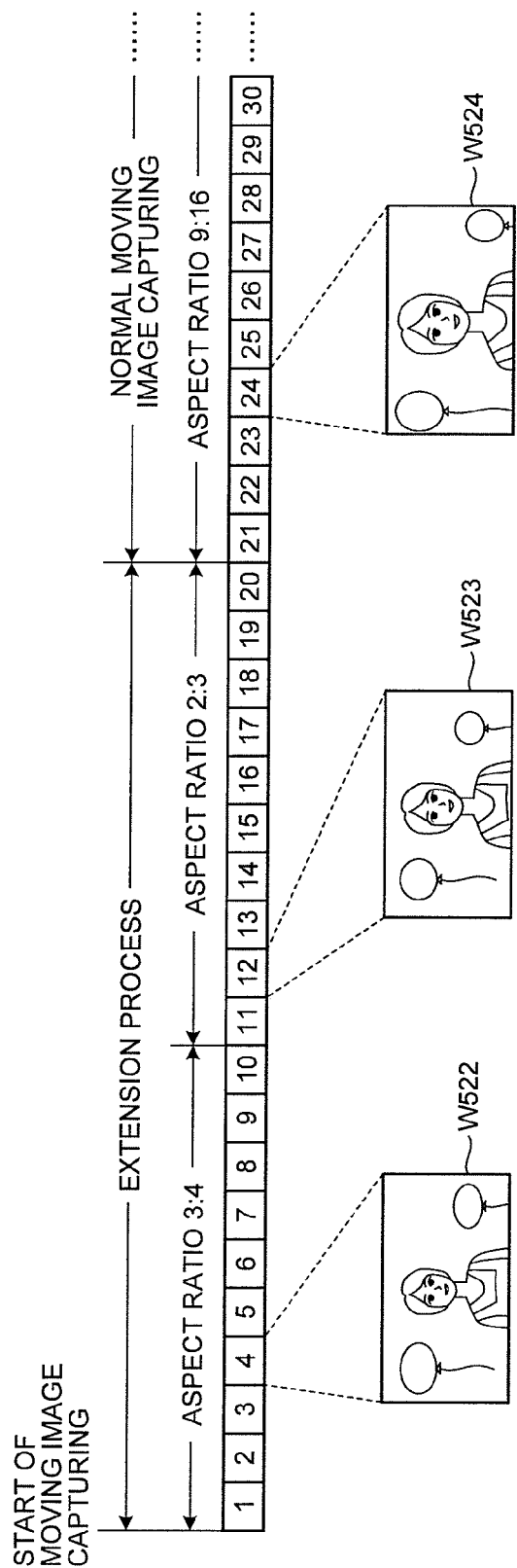
FIG. 30 is a time chart of the image conversion process of the imaging apparatus according to the third embodiment of the invention.
Figure 31:
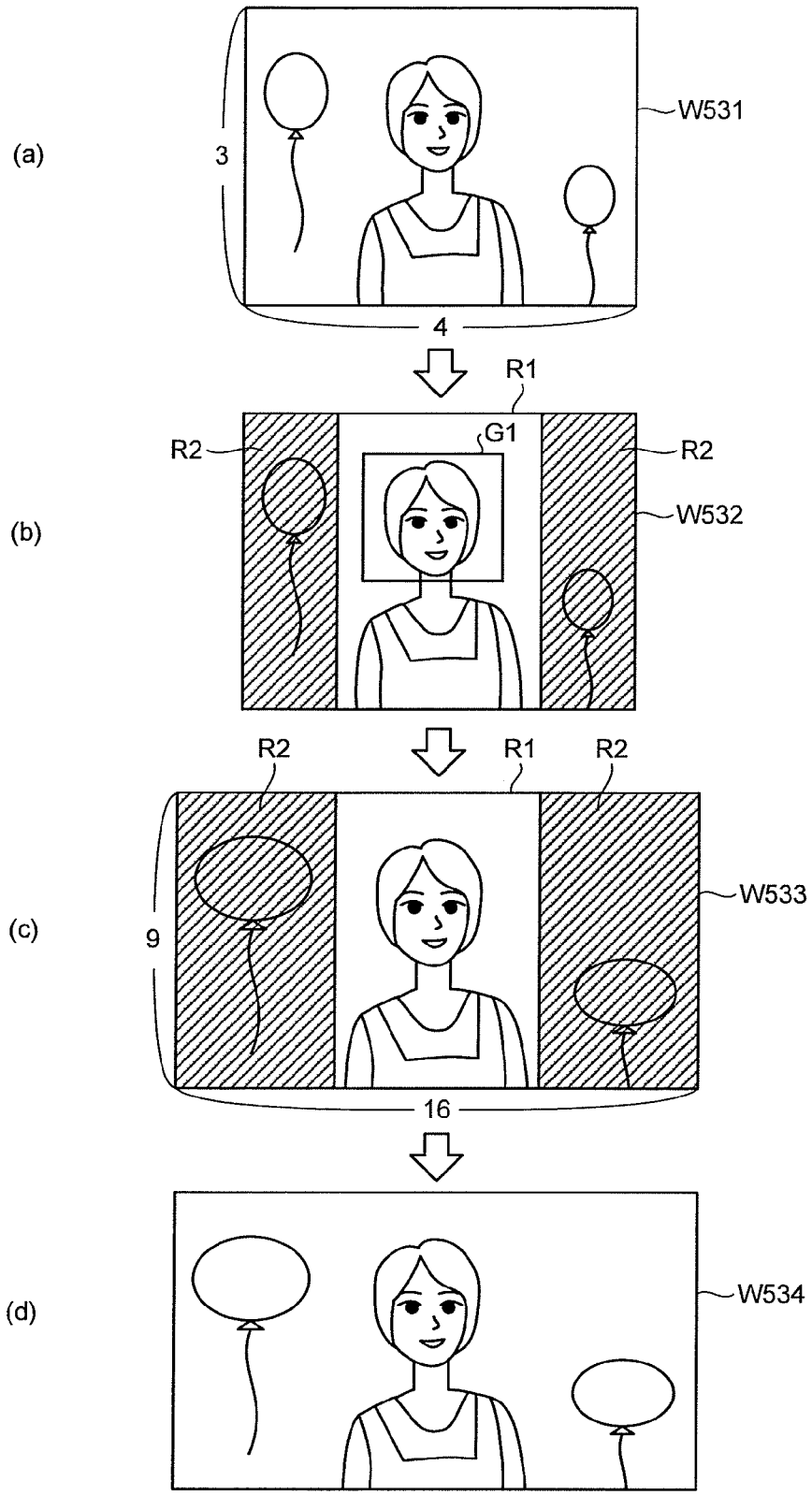
FIG. 31 illustrates the image conversion process of the imaging apparatus according to the third embodiment of the invention.
Figure 32:
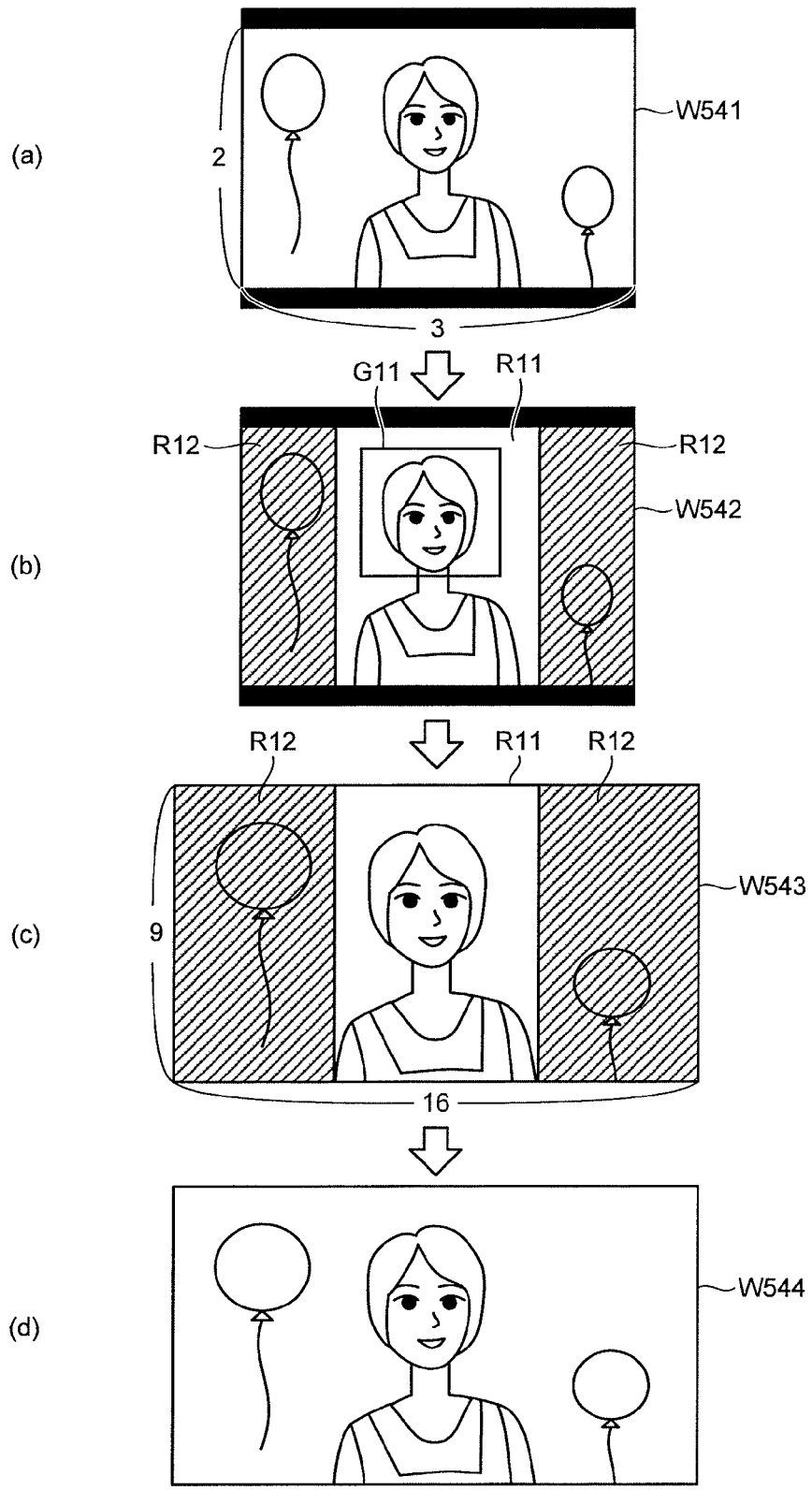
FIG. 32 illustrates the image conversion process of the imaging apparatus according to the third embodiment of the invention.

FIG. 29 is a flowchart illustrating the overview of the image conversion process of FIG. 28. FIG. 30 is a time chart of the image conversion process of the imaging apparatus 500. FIGS. 31 and 32 are diagrams illustrating the image conversion process of the imaging apparatus 500. In FIG. 30, representative images (W522 to W524) are extracted and displayed among images generated at respective periods of the image conversion process.

As shown in FIG. 29, in Step S701, the system controller 515 first sets, as the first ratio, the vertical-to-horizontal ratio of the captured image that the image trimming unit 515h generates by trimming the image included in the image data generated by the imaging element 6. Specifically, as shown in FIG. 31(a), the image trimming unit 515h generates a captured image W531 by trimming the image included in the image data generated by the imaging element 6 at the first ratio (the aspect ratio of 3:4).

In Step S702, the system controller 515 changes the number of pixels of the image data changed by the pixel number conversion unit 515g from the number of pixels of the still image to the number of pixels of the moving image.

In Step S703, the system controller 515 sets the region, which includes the face of the subject that the face detection unit 515f detects in the captured image generated by the image trimming unit 515h, as the fixation region in which the vertical-to-horizontal ratio is fixed in the captured image irrespective of the vertical-to-horizontal ratio of the captured image. Specifically, as shown in FIG. 31(b), the system controller 515 sets the region, which includes at least a face region G1 of the subject that the face detection unit 515f detects from the captured image W532, as a fixation region R1 in which the vertical-to-horizontal ratio is fixed in the captured image.

In Step S704, the region setting unit 515i sets the conversion region in which the vertical-to-horizontal ratio is varied based on the vertical-to-horizontal ratio of the captured image and positional information regarding the fixation region in which the vertical-to-horizontal ratio is fixed and which is set in the region of the captured image generated by the image trimming unit 515h. Specifically, as shown in FIG. 31(b), the region setting unit 515i sets the conversion region R2 based on the positional information regarding the fixation region R1 set by the system controller 515 and the vertical-to-horizontal ratio (first ratio) of the captured image W532.

In Step S705, the trimming unit 515j generates a trimming image, in which the vertical-to-horizontal ratio of the entire image including the fixation region R1 set by the region setting unit 515i is the second ratio, by changing the vertical-to-horizontal ratio of the conversion region R2 set by the region setting unit 515i. Specifically, as shown in FIG. 31(b) and (c), the trimming unit 515j generates a trimming image W533, in which the vertical-to-horizontal ratio of the entire image including the fixation region R1 is the second ratio, by horizontally extending the conversion region R2 of the captured image W532 from the fixation region R1 toward the outer edge.

Figure 33:
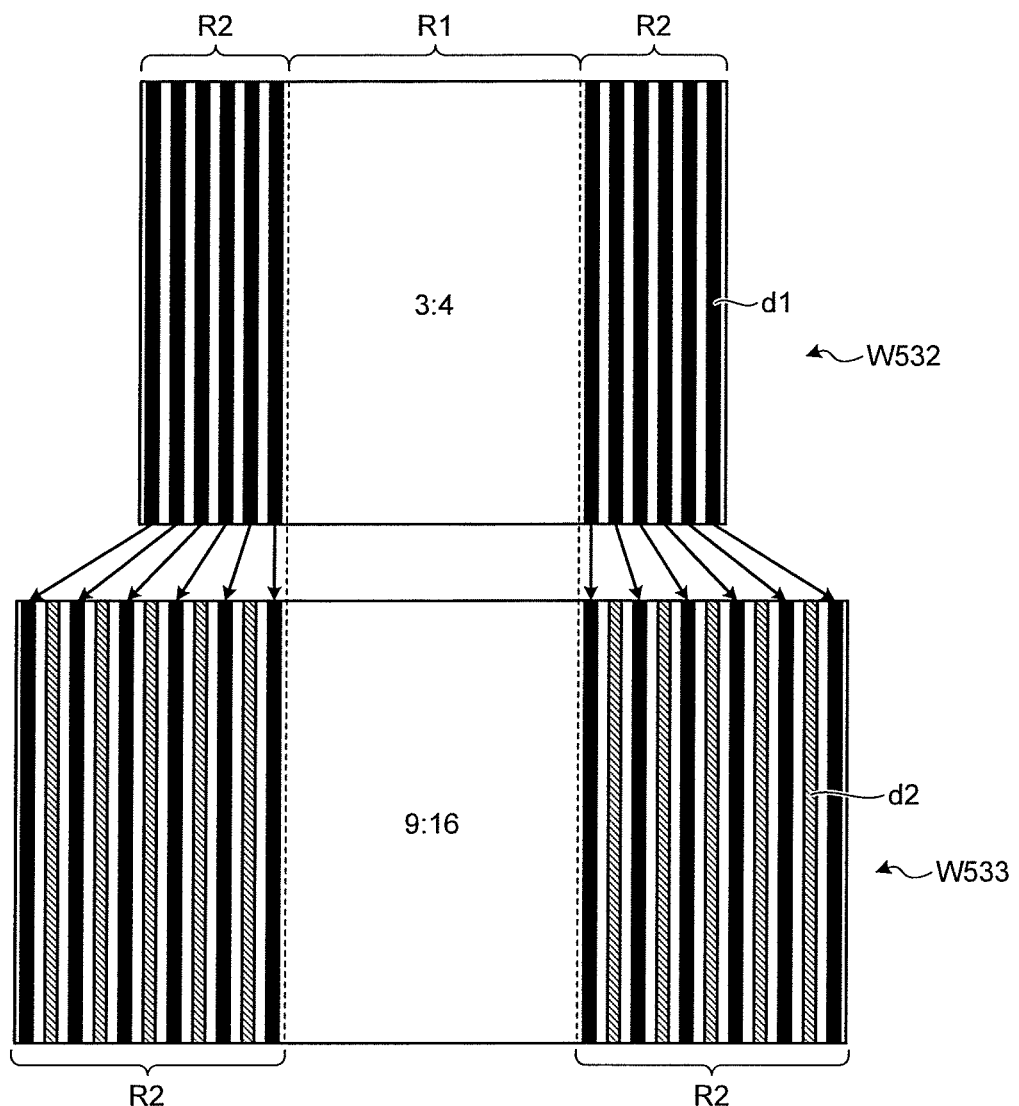
FIG. 33 is a diagram schematically illustrating an overview of a method of generating a trimming image by a trimming unit of the imaging apparatus according to the third embodiment of the invention.

FIG. 33 is a diagram schematically illustrating the overview of a method of generating the trimming image by the trimming unit 515j. In FIG. 33, a stripe region d1 indicates the original data of vertical pixel lines of the image data in the conversion region R2 before the horizontal extension. A stripe region d2 indicates interpolated data obtained through linear interpolation from the image data of the conversion region R2. As shown in FIG. 33, the trimming unit 515j disposes the vertical pixel lines of the image data in the conversion region R2 from the fixation region R1 toward the outer edge and horizontally extends the conversion region R2. Thus, the trimming unit 515j can generate the trimming image, in which the vertical-to-horizontal ratio of the entire image including the fixation region R1 is the second ratio, from the captured image W532 of the first ratio. In FIG. 33, the interpolated data corresponding to one line is inserted between the vertical pixel lines. However, for example, interpolated data corresponding to two lines may be inserted between the vertical pixel lines. Alternatively, the number of lines of the interpolated data to be inserted may be set in accordance with the vertical-to-horizontal ratio of the captured image.

In Step S706, the system controller 515 determines whether the trimming unit 515j stores the trimming images converted chronologically and continuously by the trimming unit 515j in the work area 14a by the given number of frames. Specifically, as shown in FIG. 30, the system controller 515 determines whether the trimming unit 515j stores the chronologically and continuously generated trimming images in the work area 14a by the given number of frames such as 10 frames. For example, the image W522 shown in FIG. 30 or the image W534 shown in FIG. 31(d) are included in the images of the given number of frames. When the system controller 515 determines that the trimming images are stored in the work area 14a by the given number of frames (Yes in Step S706), the imaging apparatus 500 causes the control to proceed to Step S707. On the other hand, when the system controller 515 determines that the trimming images are not stored in the work area 14a by the given number of frames (No in Step S706), the imaging apparatus 500 repeats this process.

In Step S707, the system controller 515 changes the vertical-to-horizontal ratio of the captured image that the image trimming unit 515h generates by trimming the image included in the image data generated by the imaging element 6. Specifically, as shown in FIG. 32(a), the image trimming unit 515h generates a captured image W541 by trimming the image included in the image data generated by the imaging element 6 at the vertical-to-horizontal ratio corresponding to the aspect ratio of 2:3.

In Step S708, the system controller 515 changes the number of pixels of the image data changed by the pixel number conversion unit 515g from the number of pixels of the still image to the number of pixels of the moving image.

In Step S709, the system controller 515 sets the region, which includes the face of the subject that the face detection unit 515f detects in the captured image generated by the image trimming unit 515h, as the fixation region in which the vertical-to-horizontal ratio is fixed irrespective of the vertical-to-horizontal ratio of the captured image. Specifically, as shown in FIG. 32(b), the system controller 515 sets, as a fixation region R11, a region including at least a face region G11 of a subject that the face detection unit 515f detects from the captured image W542 irrespective of the vertical-to-horizontal ratio of the captured image W542.

In Step S710, the region setting unit 515i sets a conversion region, in which the vertical-to-horizontal ratio is changed, based on the vertical-to-horizontal ratio of the captured image and the positional information regarding the fixation region set in the region of the captured image generated by the image trimming unit 515h. Specifically, as shown in FIG. 32(b), the region setting unit 515i sets a conversion region R12, in which the vertical-to-horizontal ratio is changed, based on the vertical-to-horizontal ratio of the captured image W542 and the positional information regarding the fixation region R11 set by the system controller 515.

In Step S711, the trimming unit 515j generates the trimming region, in which the vertical-to-horizontal ratio of the entire image including the fixation region R11 is the second ratio, by changing the vertical-to-horizontal ratio of the conversion region R12 set by the region setting unit 515i. Specifically, as shown in FIG. 32(b) and (c), the trimming unit 515j generates a trimming image W543, in which the vertical-to-horizontal ratio of the entire image including the fixation region R11 is the second ratio, by horizontally extending the conversion region R12 of the captured image W542 from the fixation region R11 toward the outer edge. In Step S711, the trimming unit 515j also generates the trimming image W543 in accordance with the same method as that of Step S705.

In Step S712, the system controller 515 determines the trimming images converted chronologically and continuously by the trimming unit 515j are stored in the work area 14a by the given number of frames. Specifically, as shown in FIG. 30, the system controller 515 determines whether the trimming images that the trimming unit 515j chronologically and continuously converts are stored in the work area 14a by the given number of frames (eleven to twenty). For example, the image W523 shown in FIG. 30 and the image W544 shown in FIG. 32(d) are included in the images of the given number of frames. When the system controller 515 determines that the trimming images are stored in the work area 14a by the given number of frames (Yes in Step S712), the imaging apparatus 500 causes the control to proceed to Step S713. On the other hand, when the system controller 515 determines that the trimming images are not stored in the work area 14a by the given number of frames (No in Step S712), the imaging apparatus 500 repeats this process.

In Step S713, the system controller 515 changes, to the second ratio, the vertical-to-horizontal ratio of the captured image that the image trimming unit 515h generates by trimming the image included in the image data generated by the imaging element 6.

In Step S714, the system controller 515 changes the number of pixels of the image data changed by the pixel number conversion unit 515g to the number of pixels of the moving image.

In Step S715, the system controller 515 starts the normal moving image capturing mode to temporarily store, in the work area 14a, the captured images that the image trimming unit 515h generates by trimming the images included in the image data generated by the imaging element 6 at the second ratio. Then, the imaging apparatus 500 returns the process to the main routine. Specifically, as shown in FIG. 30, the system controller 515 temporarily stores, in the work area 14a, the captured image W524 with the second ratio which the image trimming unit 515h generates by chronologically and continuously trimming the images.

According to the third embodiment described above, the system controller 515 first sets, as the fixation region, the face region of the subject that the face detection unit 515f detects in the region of the captured image generated by the image trimming unit 515h. Thereafter, when the moving image release switch 9c inputs the instruction to capture the moving image during capturing the still image, the system controller 515 performs the control to chronologically decrease the vertical-to-horizontal ratio of the conversion region set by the region setting unit 515i, fixes the vertical-to-horizontal ratio of the conversion region at the time, at which the vertical-to-horizontal ratio of the entire image including the fixation region and the conversion region becomes the second ratio, and stores the image data of the captured image generated after this time as moving image data in the memory card 12a. As a consequence, when the still image being captured is converted to the moving image with a different aspect ratio, it is possible to prevent the moving image capturing mode from starting from the unintended composition of the photographer. Moreover, the photographer can change the composition of the imaging apparatus 500 before the subject gets out of the image, since the vertical-to-horizontal ratio of the captured image generated by the image trimming unit 515h is chronologically decreased.

Figure 34:
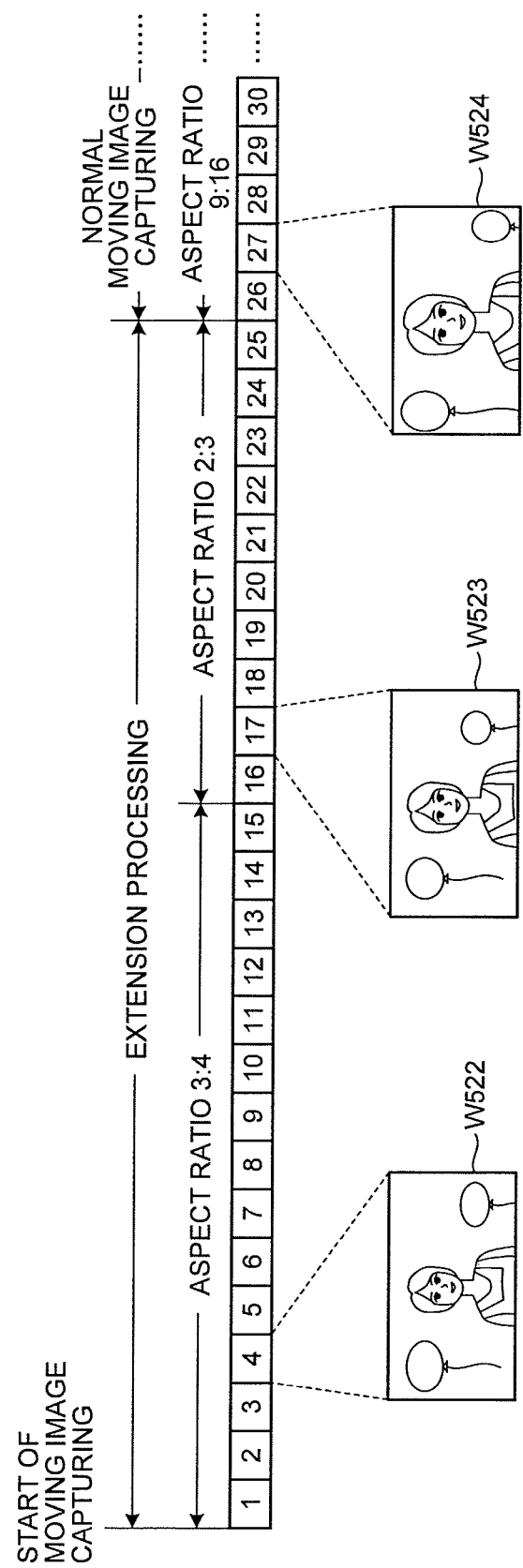
FIG. 34 is a time chart illustrating an overview of the image conversion process of the imaging apparatus according to a modification of the third embodiment of the invention.

In the third embodiment described above, the system controller 515 temporarily stores the trimming images converted chronologically and continuously by the trimming unit 515j in the work area 14a by each given number of frames. However, for example, the number of trimming images converted by the trimming unit 515j may be decreased, as the vertical-to-horizontal ratio of the captured images generated by the image trimming unit 515h approaches the second ratio. Specifically, when the vertical-to-horizontal ratio of the captured image generated by the image trimming unit 515h is the first ratio, as shown in FIG. 34, the system controller 515 stores fifteen trimming images converted chronologically and continuously by the trimming unit 515j in the work area 14a. When the aspect ratio of the captured image generated by the image trimming unit 515h is 2:3, the system controller 515 stores ten trimming images converted chronologically and continuously by the trimming unit 515j in the work area 14a. Thus, the photographer can have a sufficient time to adjust composition of the imaging apparatus 500 before the subject gets out of the capturing region.

Fourth Embodiment

Next, a fourth embodiment of the invention will be described. In the third embodiment described above, the trimming unit 515j generates the trimming image with the second ratio by disposing the vertical pixel lines of the image data at the same interval from the conversion region toward the outer edge of the fixation region. However, in the fourth embodiment of the invention, the trimming unit generates the trimming image with the second ratio by enlarging a pitch (width) between vertical pixel lines adjacent the vertical pixel line of the image data in the conversion region as the vertical pixel line of the image data gets distant from the fixation region. The imaging apparatus according to the fourth embodiment of the invention has the same configuration as that of the imaging apparatus 1 according to the above-described embodiment and only a method of generating the trimming image is different. Therefore, only the method of generating the trimming image by the trimming method will be described.

Figure 35:
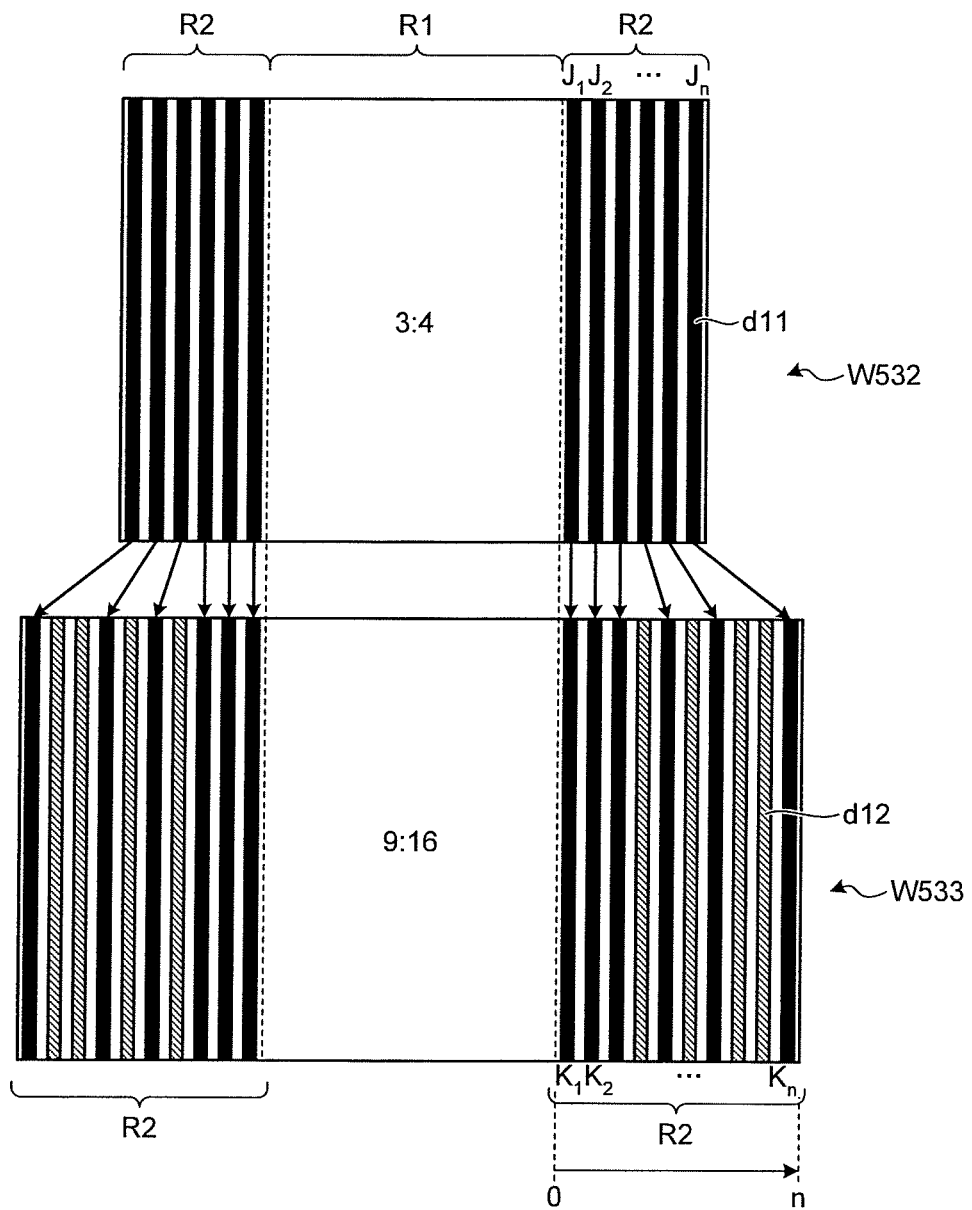
FIG. 35 is a diagram schematically illustrating an overview of a method of generating a trimming image by a trimming unit of the imaging apparatus according to a fourth embodiment of the invention.

FIG. 35 is a diagram schematically illustrating the overview of the method of generating the trimming image by a trimming unit 515j of the imaging apparatus 500 according to the fourth embodiment of the invention. In FIG. 35, a stripe region d11 indicates the original data of the vertical pixel lines of the image data in the conversion region R2 which is not yet extended horizontally. A stripe region d12 indicates interpolated data obtained through linear interpolation or the like from the adjacent pixel data when the original data of the vertical pixel lines of the image data in the conversion region R2, which is not yet extended horizontally, are extended at a predetermined pitch (interval). In FIG. 35, a case will be described in which the trimming image with the second ratio is generated from the captured image with the first ratio.

As shown in FIG. 35, the trimming unit 515j horizontally extends the conversion region R2 by enlarging the pitch (width) between the adjacent vertical pixel lines as the vertical pixel line of the image data in the conversion region R2 becomes distant from the fixation region R1 toward the outer edge. Thus, the trimming unit 515j can generate a trimming image W533 in which the vertical-to-horizontal ratio of the entire image including the fixation region R1 is the second ratio from the captured image W532 with the first ratio.

Figure 36:
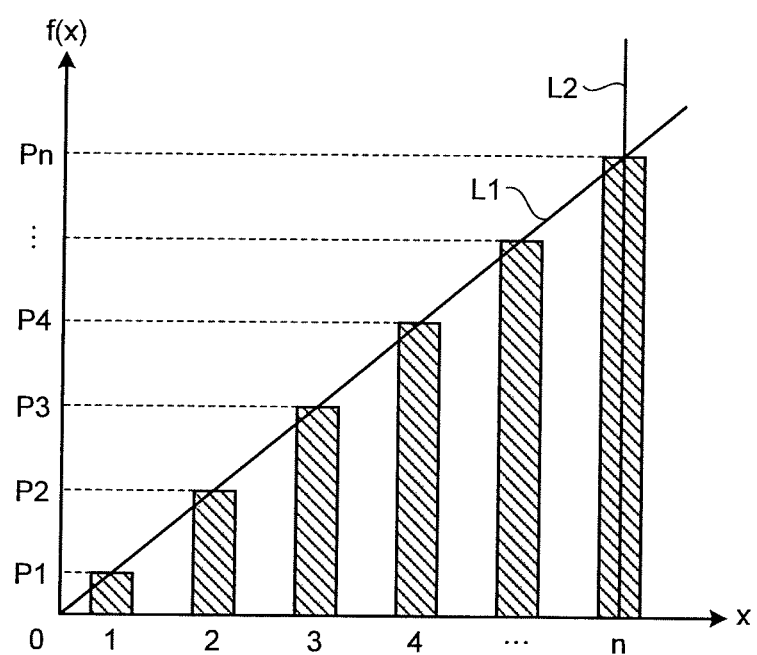
FIG. 36 is a diagram illustrating a method of calculating a pitch (width) when the trimming unit of the imaging apparatus extends respective vertical pixel lines of a conversion region in a horizontal direction according to the fourth embodiment of the invention.

Next, a method of calculating the pitch (width) will be described when the trimming unit 515j horizontally extends the vertical pixel lines of the conversion region R2. FIG. 36 is a diagram illustrating the method of calculating the pitch (width) when the trimming unit 515j extends the respective vertical pixel lines of the conversion region R2 in the horizontal direction. In FIG. 36, the origin represents the boundary (see FIG. 35) between the fixation region R1 and the conversion region R2, the horizontal axis represents the position of the vertical pixel line of the image data in the conversion region R2, and the vertical axis represents the pitch (width) when each vertical pixel line is horizontally extend from the fixation region R1. In FIG. 36, one conversion region R2 (the right region in FIG. 35) has been described. However, the pitch (width) is also calculated in accordance with the same calculation method in the other conversion region R2 (the left region in FIG. 35).

As shown in FIG. 36, on the assumption that the vertical pixel line of the conversion region R2 closest to the fixation region R1 is a vertical pixel line $J_1$ and the vertical pixel lines are sequentially $J_2, J_3, \ldots,$ and $J_n$ (see FIG. 35), the trimming unit 515j enlarges the pitch (width) between the respective vertical pixel lines along a straight line L1 as the vertical pixel lines get distant from the fixation region R1 ($J_1, J_2, J_3, \ldots,$ and $J_n$). Specifically, the straight line L1 is set by Equation (8) below.

$$f(x)=ax \qquad (8)$$

Equation (8) is set using the number of vertical pixel lines in the conversion region R2 which is not yet extended horizontally. Specifically, the respective vertical pixel lines are densely adjacent to each other in the conversion region R2 which is not yet extended horizontally. Therefore, when the position of the end of the vertical pixel line in the conversion region R2 is n, the pitch (width) from the fixation region R1 calculated by Equation (8) is the total sum $S(P1+P2+P3+ \ldots +Pn)$ of the pitches (widths) between the vertical pixel lines in the conversion region R2. That is, since n is sufficiently large, the total sum S of the pitches (widths) is an area of a range surrounded by the straight lines L1 and L2 (x=n) and the horizontal axis X. Therefore, the following expression is satisfied approximately.

$$S = \int_0^x f(x)dx \qquad (9)$$

The right side of Equation (9) is the total number of vertical pixel lines including the interpolated data (see FIG. 35) in the conversion region R2 which is horizontally extended. When this total number is assumed to be m and Equation (8) is substituted to Equation (9), Equation (10) below is satisfied.

$$m=(an^2)/2 \qquad (10)$$

As a consequence, the slope a of the straight line L1 satisfies Equation (11) below.

$$a=2m/n^2 \qquad (11)$$

Here, the pitch (width) between the vertical pixel lines is calculated using the aspect ratio of this embodiment in accordance with the calculation method described above. As a specific example, 50% of the vertical pixel lines is set to the fixation region R1, when the number of data of the first region in the vertical direction becomes the number (1080) of data of the second ratio in the vertical direction. In this case, by horizontally extending the conversion region R2, the trimming image (1080×1440 pixels→1080×1920 pixels) is generated in which the vertical-to-horizontal ratio of the entire image including the fixation region R1 is the second ratio. The calculation method described above is also applicable not only to linear extension using a linear function but also to a linear extension using a quadratic function.

First, when 50% of the vertical pixel lines is set to the fixation region R1, the line n of vertical pixel lines of one conversion region R2 is:

$$n=(1440-1440 \times 0.5)/2=360$$

Moreover, the number m of vertical pixel lines including the interpolated data of the conversion region with the second ratio is:

$$m=(1920-1440 \times 0.5)/2=600$$

Accordingly, the following equation is satisfied from Equation (11):

$$a=2m/n^2=2 \times 600/360^2=0.09259 \qquad (12)$$

FIG. 37 is a diagram illustrating the result of the pitch (width) between the adjacent vertical pixel lines of image data in the conversion region R2 calculated using Expression (12) of the calculation result of the calculation method. As shown in FIG. 37, a calculation result table T1 describes the position n of each vertical pixel line which is not yet extended, the result (a×n) of Equation (8), and the position kn of the vertical pixel line which is extended.

When the calculation result of Equation (8) is a value less than "1", as shown in FIG. 37, the calculation result is rounded up and the pitch (width) Pn is set to "1". Specifically, when the position of the vertical pixel line which is not yet expanded is "1", the calculation result of Equation (8) is "0.009259" which is less than "1". Therefore, the pitch (width) Pn is set "1".

As shown in FIG. 37, the pitch (width) Pn has an integer number. Therefore, even when the calculation result of Equation (1) is a value equal to or greater than "1", the value after the decimal point is rounded up or rounded off. For example, the pitch (width) has the value of "1" from the positions [1] to [160] of the vertical pixel lines are not yet extended. However, the errors after the decimal point are accumulated for any method. For this reason, there is the concern that the position of the end of the image data of the conversion region R2 which is not yet extended may considerably lack or exceed with respect to the position of the conversion region R2 which is extended.

Accordingly, in the fourth embodiment, the vertical pixel lines which are not yet extended are alternately subjected to the rounding-up and the rounding-off, when the pitch (width) Pn is calculated. For example, the calculation results at the positions "160" to "164" of the vertical pixel lines before the extension are alternately subjected to the rounding-up and the rounding-off. In this case, the pitch (width)s Pn of the positions "160" to "164" of the vertical pixel lines which are not yet extended become "1", "1", "2", "1", and "2", respectively. Since the pitch Pn at the position "162" of the vertical pixel line which is not extended is "2", the position Kn of the vertical pixel line which is extended is "163".

When the position of the end of the image data of the vertical pixel line in the conversion region R2 which is not yet extended does not accord with the position of the end of the image data of the vertical pixel line in the conversion region R2 which is extended, interpolated data is inserted which is calculated through the linear interpolation on the image data of the vertical pixel line of the conversion region R2 which is extended. For example, as shown at the positions "597" to "600" of the vertical pixel lines which are extended, the interpolated data calculated through the linear interpolation are inserted. Thus, the trimming unit 515$j$ can generate the trimming image, in which the vertical-to-horizontal ratio of the entire image including the fixation region R1 is the second ratio, from the captured image W532 with the first ratio.

In the fourth embodiment described above, when the capturing mode is switched to the moving image capturing mode, in which the aspect ratio is different, during the still image screen capturing mode, it is possible to prevent the moving image capturing mode from starting from the unintended composition of the photographer, as in the embodiments described above. Moreover, the photographer can change the composition of the imaging apparatus 500 before the subject gets out of the image, since the vertical-to-horizontal ratio of the captured image generated by the image trimming unit 515$h$ is chronologically decreased.

Other Embodiments

In the embodiments of the invention, the system controller sets the region including at least the region of the face of the subject detected by the face detection unit. However, for example, the region corresponding to the touch position of the outside object on the touch panel may be set as the fixation region. Thus, it is possible to prevent a desired region of the photographer from getting out of the captured region, even when a subject is not a person.

In the embodiments of the invention, the center of the captured region generated by the image trimming unit is set as the fixation region. However, for example, the left region of the captured region may be set as the fixation region. Thus, it is possible to prevent the subject from getting out of the captured region, even when the subject is not present at the center of the captured region of the imaging apparatus.

In the embodiments of the invention, the first ratio which is the vertical-to-horizontal ratio of the image at the time of capturing the still image is 3/4 (corresponding to the aspect ratio of 3:4). However, for example, the first ratio may be 2/3 (corresponding to the aspect ratio of 2:3). That is, the vertical-to-horizontal ratio of the first ratio may be greater than the second ratio.

In the embodiments of the invention, the system controller changes the vertical-to-horizontal ratio of the captured image generated by the image trimming unit step by step. However, for example, the vertical-to-horizontal ratio may be changed at a constant slope of a linear function.

In the embodiments of the invention, a single-lens digital camera has been described as an example of the imaging apparatus 1. However, for example, the invention is applicable to various electronic apparatuses, such as a portable telephone attached with a digital moving image camera or camera, capable of capturing a still image and a moving image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Note (Note 1) An imaging apparatus comprising:

a lens unit that condenses light from a visual field region;

an imaging unit that includes an imaging element for converting the light condensed by the lens unit into an electric signal and continuously generates electronic image data based on the electric signal;

a storage unit that stores the image data generated by the imaging unit;

a display unit that displays an image based on the image data generated by the imaging unit;

an input unit that receives an input of a change instruction signal used to change a first capturing mode in which capturing is performed at a first vertical-to-horizontal ratio to a second capturing mode in which the capturing is performed at a second vertical-to-horizontal ratio different from the first vertical-to-horizontal ratio; and an image trimming unit that generates a captured image that is trimmed from an image included in image data generated by the imaging unit when the change instruction signal is input by the input unit while the imaging apparatus is in the first capturing mode, the captured image having a vertical-to-horizontal ratio between the first vertical-to-horizontal ratio and the second vertical-to-horizontal ratio.

(Note 2) The imaging apparatus according to Note 1, further comprising:

a target detection unit that detects a subject from an imaging-region image which is an image corresponding to the image data generated by the imaging unit when the first capturing mode is switched to the second capturing mode; and a region setting unit that performs initial setting on a record region trimmed from the imaging-region image and recorded at the second vertical-to-horizontal ratio based on a position of the subject detected by the target subject detection unit and performs setting of moving a central position of the initially set record region toward a central position of the imaging-region image by a predetermined amount,
wherein the image trimming unit generates the captured image trimmed from the imaging-region image based on the record region set by the region setting unit.

(Note 3) The imaging apparatus according to Note 2, wherein the second vertical-to-horizontal ratio is less than the first vertical-to-horizontal ratio.

(Note 4) The imaging apparatus according to Note 3, wherein the target subject detection unit extracts a central position of the subject, and
the region setting unit performs initial setting so that a central position of the record region in a vertical direction accords with the central position of the subject in the vertical direction.

(Note 5) The imaging apparatus according to Note 4, wherein the subject is a person, an animal, or an object that is being tracked with an auto focus locked, and
the target subject detection unit extracts a predetermined position of the subject as the central position.

(Note 6) The imaging apparatus according to Note 5, wherein the region setting unit moves the central position of the record region in the vertical direction, and
the image trimming unit generates the captured image trimmed from the imaging-region image by cutting an upper end portion and/or a lower end portion of the imaging-region image in the vertical direction.

(Note 7) The imaging apparatus according to Note 6, further comprising a hand-shake correction unit that calculates a shake amount of an image corresponding to the image data generated by the imaging unit and corrects the captured image recorded in the record region based on the shake amount.

(Note 8) The imaging apparatus according to Note 7, wherein the hand-shake correction unit performs the correction only in a second direction perpendicular to a first direction when a distance between one end of the record region in the first direction and one end of the imaging-region image in the first direction is less than a predetermined range, and the hand-shake correction unit performs the correction in the first and second directions when the distance is equal to or greater than the predetermined range.

What is claimed is:

1. An imaging apparatus comprising:
a lens unit that condenses light from a visual field region;
an imaging unit that includes an imaging element for converting the light condensed by the lens unit into an electric signal and continuously generates electronic image data based on the electric signal;
a storage unit that stores the image data generated by the imaging unit;
a display unit that displays an image based on the image data generated by the imaging unit;
an input unit that receives an input of a change instruction signal used to change a first capturing mode in which capturing is performed at a first vertical-to-horizontal ratio to a second capturing mode in which the capturing is performed at a second vertical-to-horizontal ratio different from the first vertical-to-horizontal ratio;
a first image trimming unit that generates a captured image that is trimmed from an image included in image data generated by the imaging unit when the change instruction signal is input by the input unit while the imaging apparatus is in the first capturing mode, the captured image having a vertical-to-horizontal ratio between the first vertical-to-horizontal ratio and the second vertical-to-horizontal ratio;
a target detection unit that detects a subject from an imaging-region image which is an image corresponding to the image data generated by the imaging unit when the first capturing mode is switched to the second capturing mode;
a region setting unit that performs initial setting on a record region trimmed from the imaging-region image and recorded at the second vertical-to-horizontal ratio based on a position of the subject detected by the target subject detection unit and performs setting of moving a central position of the initially set record region toward a central position of the imaging-region image by a predetermined amount, wherein the first image trimming unit generates the captured image trimmed from the imaging-region image based on the record region set by the region setting unit; and
an output unit that outputs an indication in which the vertical-to-horizontal ratio of the captured image becomes the second vertical-to-horizontal ratio, when the vertical-to-horizontal ratio of the captured image generated by the first image trimming unit reaches the second vertical-to-horizontal ratio after the change instruction signal is input by the input unit, wherein
the input unit includes a switch advancing or retreating by a pressing force from the outside, and
the switch receives an input of the change instruction signal when the switch is halfway pressed, and the switch receives an input of a capturing instruction signal of the second capturing mode when the switch is fully pressed.

2. The imaging apparatus according to claim 1, wherein the second vertical-to-horizontal ratio is less than the first vertical-to-horizontal ratio.

3. The imaging apparatus according to claim 2, wherein the target subject detection unit extracts a central position of the subject, and
the region setting unit performs initial setting so that a central position of the record region in a vertical direction accords with the central position of the subject in the vertical direction.

4. The imaging apparatus according to claim 3, wherein the subject is a person, an animal, or an object that is being tracked with an auto focus locked, and
the target subject detection unit extracts a predetermined position of the subject as the central position.

5. The imaging apparatus according to claim 4, wherein the region setting unit moves the central position of the record region in the vertical direction, and
the first image trimming unit generates the captured image trimmed from the imaging-region image by cutting an upper end portion and/or a lower end portion of the imaging-region image in the vertical direction.

6. The imaging apparatus according to claim 1, further comprising a control unit that reduces a vertical-to-horizontal ratio of the captured images sequentially trimmed and generated by the first image trimming unit with time, from the first vertical-to-horizontal ratio to the second vertical-to-horizontal ratio when the change instruction signal is input by the input unit in the first capturing mode.

7. The imaging apparatus according to claim 1, further comprising an image composing unit that generates a composite image in which a vertical-to-horizontal ratio of its entire image accords with the second vertical-to-horizontal ratio by adding an auxiliary image with a vertical-to-horizontal ratio corresponding to the vertical-to-horizontal ratio of the captured image generated by the first image trimming unit to the captured image, wherein the control unit causes the image composing unit to generate the composite image until the vertical-to-horizontal ratio of the captured image generated by the first image trimming unit reaches the second vertical-to-horizontal ratio, when the capturing instruction signal is input by the input unit during change in the vertical-to-horizontal ratio of the captured image generated by the first image trimming unit.

8. The imaging apparatus according to claim 7, further comprising a setting unit that sets a change timing of the vertical-to-horizontal ratio of the captured image changed by the first image trimming unit,
wherein the control unit reduces the vertical-to-horizontal ratio of the captured image generated by the first image trimming unit at the change timing set by the setting unit.

9. An imaging apparatus comprising:
a lens unit that condenses light from a visual field region;
an imaging unit that includes an imaging element for converting the light condensed by the lens unit into an electric signal and continuously generates electronic image data based on the electric signal;
a storage unit that stores the image data generated by the imaging unit;
a display unit that displays an image based on the image data generated by the imaging unit;
an input unit that receives an input of a change instruction signal used to change a first capturing mode in which capturing is performed at a first vertical-to-horizontal ratio to a second capturing mode in which the capturing is performed at a second vertical-to-horizontal ratio different from the first vertical-to-horizontal ratio;
a first image trimming unit that generates a captured image that is trimmed from an image included in image data generated by the imaging unit when the change instruction signal is input by the input unit while the imaging apparatus is in the first capturing mode, the captured image having a vertical-to-horizontal ratio between the first vertical-to-horizontal ratio and the second vertical-to-horizontal ratio;
a region setting unit that sets a fixation region in which a vertical-to-horizontal ratio is fixed and a conversion region in which the vertical-to-horizontal ratio changes, within a region of the captured image generated by the first image trimming unit;
a second image trimming unit that generates a trimming image in which a vertical-to-horizontal ratio of the entire image including the fixation region is the second vertical-to-horizontal ratio by changing the vertical-to-horizontal ratio of the conversion region set by the region setting unit; and
a control unit that chronologically reduces the vertical-to-horizontal ratio of the conversion region set by the region setting unit when the change instruction signal is input by the input unit during the first capturing mode, fixes the vertical-to-horizontal ratio of the conversion region at a time when the vertical-to-horizontal ratio of the entire image including the fixation region and the conversion region becomes the second vertical-to-horizontal ratio, and stores image data of the captured image generated after the time as moving image data in the storage unit.

10. The imaging apparatus according to claim 9, wherein the second image trimming unit is configured in a manner such that a pitch between adjacent vertical pixel lines of vertical pixel lines of the image data increases in the conversion region as a distance of the vertical pixel line from the fixation region increases.

11. The imaging apparatus according to claim 10, wherein the control unit performs control of reducing the number of trimming images that are generated continuously in terms of time with the same vertical-to-horizontal ratio by the second image trimming unit, as the vertical-to-horizontal ratio of the captured image generated by the first image trimming unit becomes close to the second vertical-to-horizontal ratio.

12. The imaging apparatus according to 11, further comprising a face detection unit that detects a face of a subject included in an image corresponding to the image data generated by the imaging unit,
wherein the region setting unit sets a region including at least a face region of the subject detected by the face detection unit as the fixation region.

13. The imaging apparatus according to claim 12, wherein the input unit includes a touch panel that is provided on an image display surface of the display unit and receives an input of a signal in accordance with a touch position of an external object, and
the region setting unit sets a region corresponding to the touch position of the external object on the touch panel as the fixation region.

14. An imaging method executed in an imaging apparatus, comprising:
receiving an input of a change instruction signal for changing a first capturing mode in which capturing is performed at a first vertical-to-horizontal ratio to a second capturing mode in which the capturing is performed at a second vertical-to-horizontal ratio different from the first vertical-to-horizontal ratio;
generating a captured image trimmed from an image included in image data generated by an imaging unit of the imaging apparatus when the change instruction signal is input during the first capturing mode, the captured image having a vertical-to-horizontal ratio between the first vertical-to-horizontal ratio and the second vertical-to-horizontal ratio;
setting a fixation region in which a vertical-to-horizontal ratio is fixed and a conversion region in which the vertical-to-horizontal ratio changes, within a region of the generated captured image;
generating a trimming image in which a vertical-to-horizontal ratio of the entire image including the fixation region is the second vertical-to-horizontal ratio by changing the vertical-to-horizontal ratio of the conversion region; and
chronologically reducing the vertical-to-horizontal ratio of the conversion region when the change instruction signal is input during the first capturing mode, fixing the vertical-to-horizontal ratio of the conversion region at a time when the vertical-to-horizontal ratio of the entire image including the fixation region and the conversion region becomes the second vertical-to-horizontal ratio, and storing image data of the captured image generated after the time as moving image data in a storage unit.

15. A non-transitory computer-readable recording medium with an executable program stored thereon, wherein the program instructs a processor of an imaging apparatus to perform:
receiving an input of a change instruction signal for changing a first capturing mode in which capturing is performed at a first vertical-to-horizontal ratio to a second capturing mode in which the capturing is performed at a second vertical-to-horizontal ratio different from the first vertical-to-horizontal ratio; and
generating a captured image trimmed from an image included in image data generated by an imaging unit of the imaging apparatus when the change instruction signal is input during the first capturing mode, the captured image having a vertical-to-horizontal ratio between the first vertical-to-horizontal ratio and the second vertical-to-horizontal ratio;

detecting a subject from an imaging-region image which is an image corresponding to the image data generated by the imaging unit when the first capturing mode is switched to the second capturing mode;

performing an initial setting on a record region trimmed from the imaging-region image and recorded at the second vertical-to-horizontal ratio based on a position of the subject detected and performing setting of moving a central position of the initially set record region toward a central position of the imaging-region image by a predetermined amount, wherein the captured image trimmed from the imaging-region image is generated based on the set record region;

outputting an indication in which the vertical-to-horizontal ratio of the captured image becomes the second vertical-to-horizontal ratio, when the vertical-to-horizontal ratio of the captured image reaches the second vertical-to-horizontal ratio after the change instruction signal is input; and pressing a switch to advance or retreat, wherein the switch receives an input of the change instruction signal when the switch is halfway pressed, and the switch receives an input of a capturing instruction signal of the second capturing mode when the switch is fully pressed.

* * * * *